US012803206B2

(12) United States Patent
Miyamura

(10) Patent No.: US 12,803,206 B2
(45) Date of Patent: Nov. 17, 2026

(54) TERMINAL FITTING CONNECTION STRUCTURE AND JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 18/690,202

(22) PCT Filed: Aug. 25, 2022

(86) PCT No.: PCT/JP2022/031979
§ 371 (c)(1),
(2) Date: Mar. 7, 2024

(87) PCT Pub. No.: WO2023/042620
PCT Pub. Date: Mar. 23, 2023

(65) Prior Publication Data

US 2024/0380150 A1 Nov. 14, 2024

(30) Foreign Application Priority Data

Sep. 15, 2021 (JP) ................................ 2021-149878

(51) Int. Cl.
*H01R 13/11* (2006.01)
*H01R 13/436* (2006.01)
*H01R 13/514* (2006.01)

(52) U.S. Cl.
CPC ......... *H01R 13/113* (2013.01); *H01R 13/514* (2013.01); *H01R 13/4367* (2013.01)

(58) Field of Classification Search
CPC . H01R 13/113; H01R 13/514; H01R 13/4367
(Continued)

(56) References Cited

U.S. PATENT DOCUMENTS 6,319,071 B1 * 11/2001 Sato ...................... H01R 4/185 439/701
6,537,080 B2 * 3/2003 Sato ...................... H01R 9/226 439/43

(Continued)

FOREIGN PATENT DOCUMENTS

JP S61-068487 U1 5/1986
JP 2000-294351 A 10/2000

(Continued)

OTHER PUBLICATIONS

International Search Report issued on Nov. 8, 2022 for WO 2023/042620 A1 (4 pages).

*Primary Examiner* — Gary F Paumen
(74) *Attorney, Agent, or Firm* — Venjuris, P.C.

(57) ABSTRACT

A terminal fitting connection structure connects a plurality of terminal fittings to each other such that the terminal fittings are arranged side by side in one direction, wherein each terminal fitting includes a terminal body portion that has a square tubular shape and in which a connecting portion is provided, the terminal body portion is provided with a protrusion that protrudes outward of the terminal body portion in a direction in which the terminal fittings are arranged side by side, a plate portion included in the
(Continued)

terminal body portion is provided with an opening that extends through the plate portion in the direction in which the terminal fittings are arranged side by side, and the protrusion of one terminal fitting of two adjacent terminal fittings enters the terminal body portion of the other terminal fitting from the opening thereof and is connected to the connecting portion.

5 Claims, 18 Drawing Sheets

(58) Field of Classification Search
USPC .......................................................... 439/701
See application file for complete search history.

(56) References Cited

U.S. PATENT DOCUMENTS

| | | | | |
|---|---|---|---|---|
| 6,638,115 | B2 * | 10/2003 | Mochizuki ........... | H01R 13/506<br>439/701 |
| 7,425,160 | B2 * | 9/2008 | Lee ...................... | H01R 13/514<br>439/701 |
| 2015/0111444 | A1 | 4/2015 | Sakamoto | |

FOREIGN PATENT DOCUMENTS

| | | | |
|---|---|---|---|
| JP | 2000-299158 | A | 10/2000 |
| JP | 2002-124333 | A | 4/2002 |
| JP | 2021-101418 | A | 7/2021 |

* cited by examiner

TERMINAL FITTING CONNECTION STRUCTURE AND JOINT CONNECTOR

CROSS REFERENCE TO RELATED APPLICATIONS

This application is a national phase of PCT application No. PCT/JP2022/031979, filed on 25 Aug. 2022, which claims priority from Japanese patent application No. 2021-149878, filed on 15 Sep. 2021, all of which are incorporated herein by reference.

TECHNICAL FIELD

The present disclosure relates to a terminal fitting connection structure and a joint connector.

BACKGROUND

Patent Document 1 discloses a structure in which a joint connector having a male terminal and a mating connector having a plurality of female terminals attached to a mating housing are fitted to one another, and the plurality of female terminals are electrically connected by the male terminal.

PRIOR ART DOCUMENT

Patent Document

Patent Document 1: JP 2021-101418 A

SUMMARY OF THE INVENTION

Problems to be Solved

The structure described in Patent Document 1 requires a male terminal in addition to a plurality of female terminals, and therefore has a large number of components.

The present disclosure has been completed based on the above circumstances, and aims to reduce the number of components.

Means to Solve the Problem

A terminal fitting connection structure according to a first disclosure is a terminal fitting connection structure for connecting a plurality of terminal fittings to each other such that the terminal fittings are arranged side by side in one direction, wherein each terminal fitting includes a terminal body portion that has a square tubular shape and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, and the protrusion of one terminal fitting of two adjacent terminal fittings enters the terminal body portion of the other terminal fitting from the opening thereof and is connected to the connecting portion.

A joint connector according to a second disclosure includes: a plurality of housings that have terminal housing portions and are stacked and attached to each other; communication holes provided in the housings and are in communication with internal spaces of the terminal housing portions from outer surfaces of the housings; and a plurality of terminal fittings attached to each terminal body portion, wherein each terminal fitting includes a terminal body portion that has a square tubular shape and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, and in a state where the plurality of housings are stacked and attached to each other, the protrusion of one terminal fitting of two adjacent terminal fittings enters the terminal body portion of the other terminal fitting from the opening thereof and is connected to the connecting portion.

Effect of the Invention

According to the present disclosure, the number of components can be reduced.

DETAILED DESCRIPTION TO EXECUTE THE INVENTION

Figure 1:
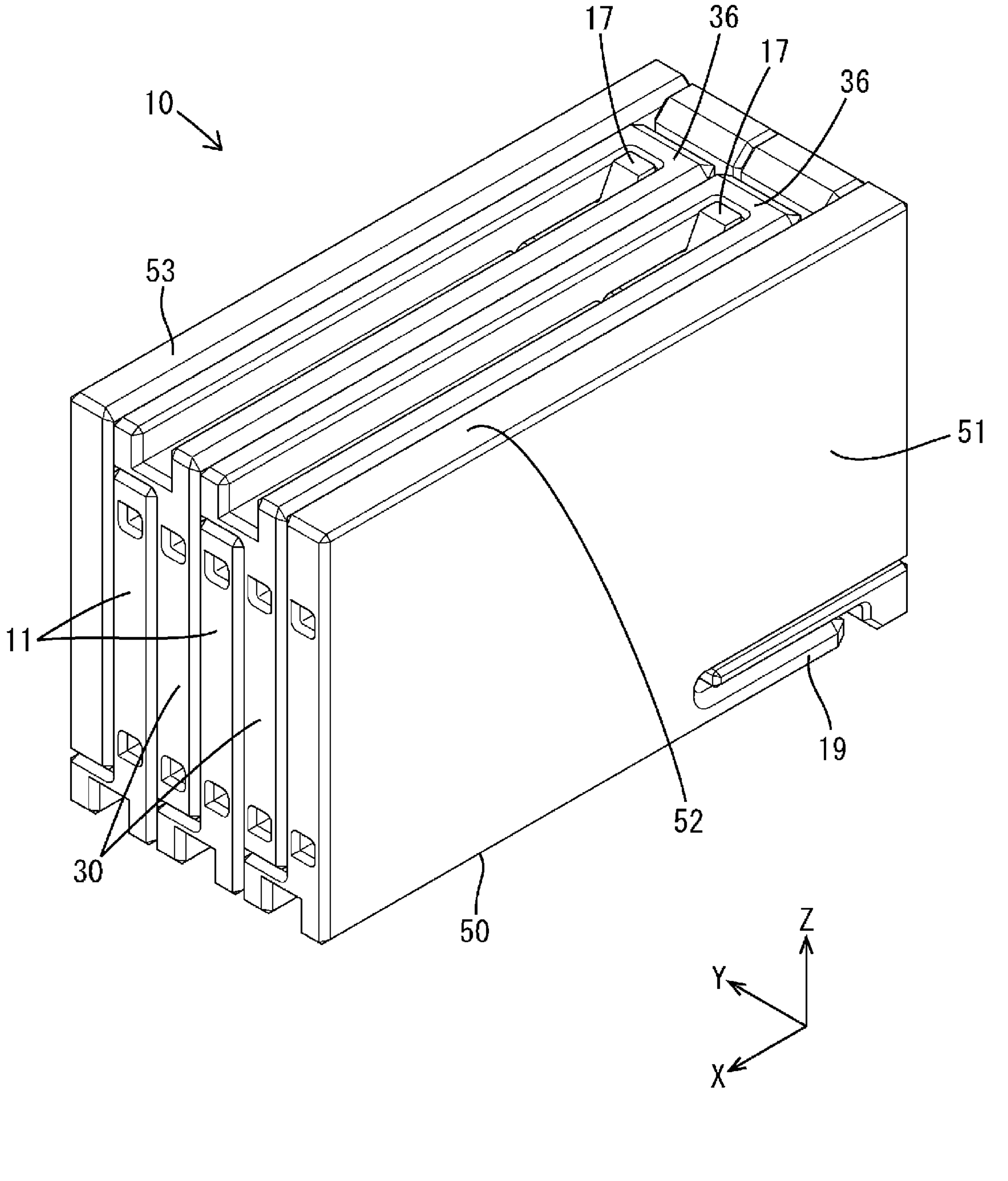
FIG. 1 is a perspective view showing a connector according to a first embodiment, viewed diagonally from the top front left.

Description of Embodiments According to Present Disclosure

First, embodiments of the present disclosure will be listed and described.

(1) A terminal fitting connection structure according to a first disclosure is a terminal fitting connection structure for connecting a plurality of terminal fittings to each other such that the terminal fittings are arranged side by side in one direction, wherein each terminal fitting includes a terminal body portion that has a square tubular shape and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, and the protrusion of one terminal fitting of two adjacent terminal fittings enters the terminal body portion of the other terminal fitting from the opening thereof and is connected to the connecting portion. With the configuration according to the first disclosure, when a plurality of terminal fittings are arranged side by side, the protrusion of one terminal fitting of the adjacent terminal fittings enters the internal space of the terminal body portion of the other terminal fitting from the opening thereof and is connected to the connecting portion. The connection between the protrusion and the connecting portion allows the adjacent terminal fittings to be electrically connected to each other. Since no conductive member other than the terminal fittings is required, the number of components can be reduced.

(2) It is preferable that the connecting portion includes an elastic contact piece that is elastically deformable. With this configuration, due to the elastic restoring force of the elastic contact piece, the protrusion and the elastic contact piece can be connected with a predetermined contact pressure. The elastic contact piece is housed in the terminal body portion, and is therefore less likely to be deformed due to interference by a foreign object.

(3) In (2), it is preferable that the elastic contact piece is provided with a guide surface against which the protrusion slides in a process in which the adjacent terminal fittings are arranged side by side. With this configuration, by sliding the protrusion against the guide surface, the protrusion and the elastic contact piece can be smoothly connected to each other.

(4) In (3), it is preferable that a direction in which the guide surface guides the protrusion intersects the direction in which the terminal fittings are arranged side by side. With this configuration, when terminal fittings are to be connected to each other, the protrusion enters the terminal body portion from the opening in a state where adjacent terminal fittings are displaced from each other. Thereafter, the terminal fittings are moved relative to each other in a direction intersecting the direction in which the terminal fittings are arranged side by side, the protrusion slides against the guide surface, and the adjacent terminal fittings are arranged side by side. The direction in which the guide surface guides the protrusion is a direction intersecting the direction in which the terminal fitting are arranged side by side, and therefore, compared to the case where the guide direction of the guide surface is parallel to the direction in which the terminal fittings are arranged side by side, the pitch in which the terminal fittings are arranged side by side can be reduced.

(5) In (3) or (4), it is preferable that the terminal body portion has an elongated shape, and a direction in which the protrusion moves when guided by the guide surface is parallel to a longitudinal direction of the terminal body portion. With this configuration, it is possible to ensure that the guide surface is sufficiently long, so that sliding resistance in the process of the protrusion sliding against the guide surface can be suppressed.

(6) It is preferable that the protrusion has a bent shape formed by folding a plate-shaped portion. With this configuration, the rigidity of the protrusion is higher than that in the case where the protrusion has a single-plate shape.

(7) A joint connector according to a second disclosure includes: a plurality of housings that respectively have terminal housing portions and are stacked and attached to each other: communication holes provided in the housings and are in communication with internal spaces of the terminal housing portions from outer surfaces of the housings; and a plurality of terminal fittings attached to each terminal body portion, wherein each terminal fitting includes a terminal body portion that has a square tubular shape and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, and in a state where the plurality of housings are stacked and attached to each other, the protrusion of one terminal fitting of two adjacent terminal fittings enters the terminal body portion of the other terminal fitting from the opening thereof and is connected to the connecting portion. With the configuration according to the second disclosure, in a state where a plurality of housings are stacked and attached to each other, a plurality of terminal fittings are arranged side by side. The protrusion of one terminal fitting of two adjacent terminal fittings enters the terminal body portion of the other terminal fitting from the opening thereof and is connected to the connecting portion. The connection between the protrusion and the connecting portion allows the adjacent terminal fittings to be electrically connected to each other. Since no conductive member other than the terminal fittings is required, the number of components can be reduced.

(8) In (7), the terminal housing portions are each configured to house a terminal fitting so as to be exposed in the stacking direction. With this configuration, the joint connector can be downsized in the stacking direction, compared to the case where the terminal housing portions house terminal fittings without exposing them in the stacking direction.

DETAILS OF EMBODIMENTS ACCORDING TO PRESENT DISCLOSURE

First Embodiment

A first embodiment embodying the present disclosure will be described with reference to FIGS. 1 to 18. Note that the present invention is not limited to these examples, but is indicated by the scope of the claims, and includes all changes within the meaning and range equivalent to the scope of the claims. In the first embodiment, regarding the front-rear direction, the side indicated by the X-axis in FIGS. 1 to 17 is defined as the front. Regarding the left-right direction, the side indicated by the Y-axis in FIGS. 1 to 13, 15, 16, and 18 is defined as the right. Regarding the top-bottom direction, the side indicated by the Z-axis in FIGS. 1 to 12, 14, 15, 17, and 18 is defined as the top.

(Overview of Joint Connector and Connection Structure for Terminal Fittings 60)

Figure 2:
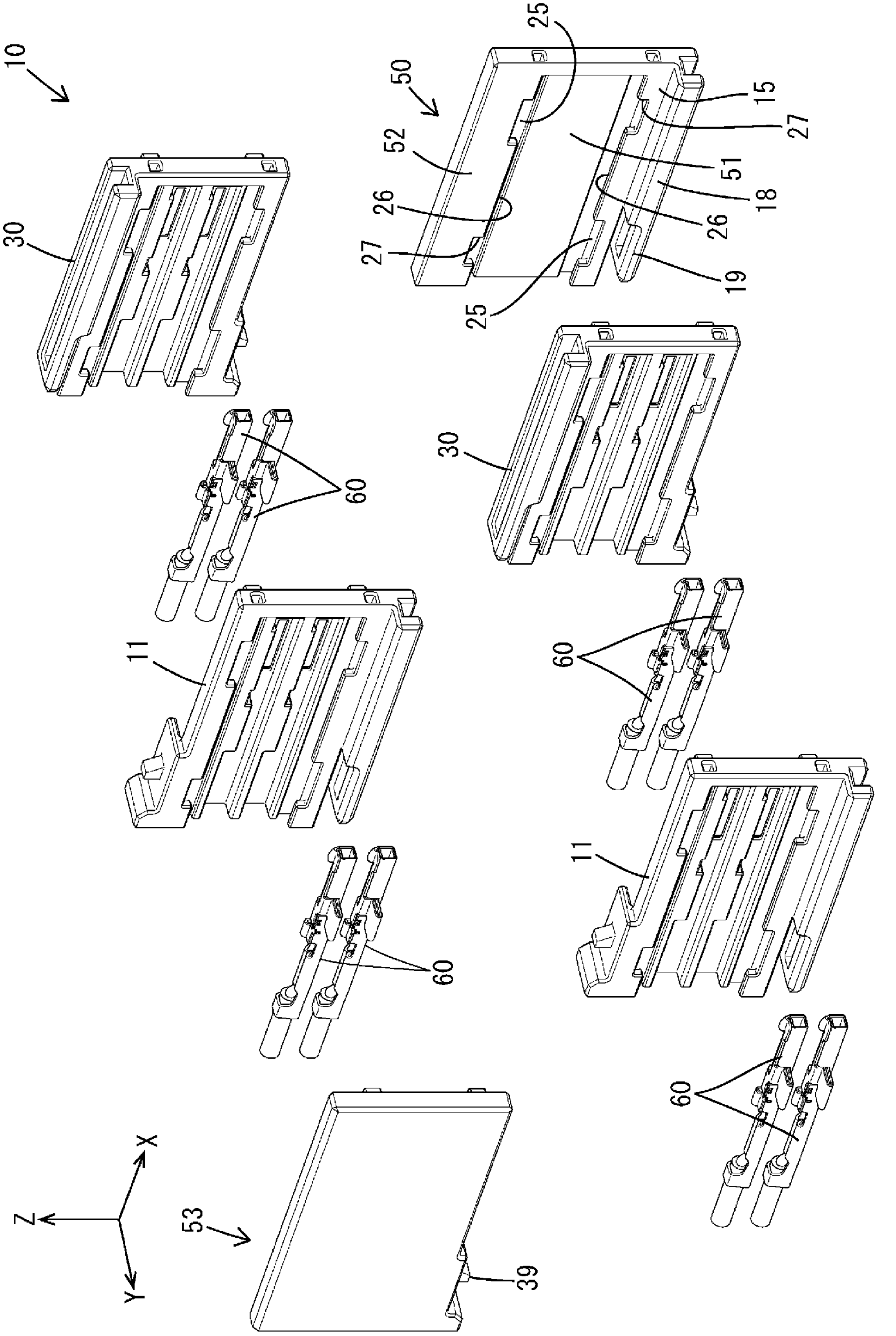
FIG. 2 is a perspective view showing the connector in a disassembled state, viewed diagonally from the top front right.

A joint connector according to the first embodiment includes a connection structure for terminal fittings 60, and is used in a CAN (Controller Area Network) mounted on a vehicle, a transmission line routed in a non-vehicle object, or the like. As shown in FIG. 1, the joint connector has a parallelopiped shape as a whole. As shown in FIG. 2, one joint connector is formed by attaching one stacked housing 10 and a plurality of pairs of terminal fittings 60 to each other. One stacked housing 10 is formed by stacking a plurality of first housings 11, a plurality of second housings 30, one first cover 50, and one second cover 53 in the left-right direction and attaching them to each other. The number of first housings 11, the number of second housings 30, and the number of pairs of terminal fittings 60 are the same.

In the stacked housing 10 in an assembled state, the first cover 50 is disposed at the leftmost position in the stacked housing 10, and the second cover 53 is disposed at the rightmost position in the stacked housing 10. A second housing 30 is positioned to the right of the first cover 50, and a first housing 11 is positioned to the left of the second cover 53. The same number of first housings 11 and second housings 30 are alternately arranged between the first cover 50 and the second cover 53 in the left-right direction.

A pair of upper and lower terminal fittings 60 are attached to one first housing 11. A pair of upper and lower terminal fittings 60 are also attached to one second housing 30. When the two housings 11 and 30 are stacked and attached to each other, the plurality of terminal fittings 60 attached on the upper level sides of the two housings 11 and 30 are disposed side by side in the stacking direction. When the two housings 11 and 30 are stacked and attached to each other, the plurality of terminal fittings 60 attached on the lower level sides of the two housings 11 and 30 are lined up in parallel to the stacking direction. The plurality of terminal fittings 60 arranged side by side in parallel to the stacking direction are in direct contact with each other so as to be electrically conductive, without using another conductive member.

(First Housings 11)

Figure 4:
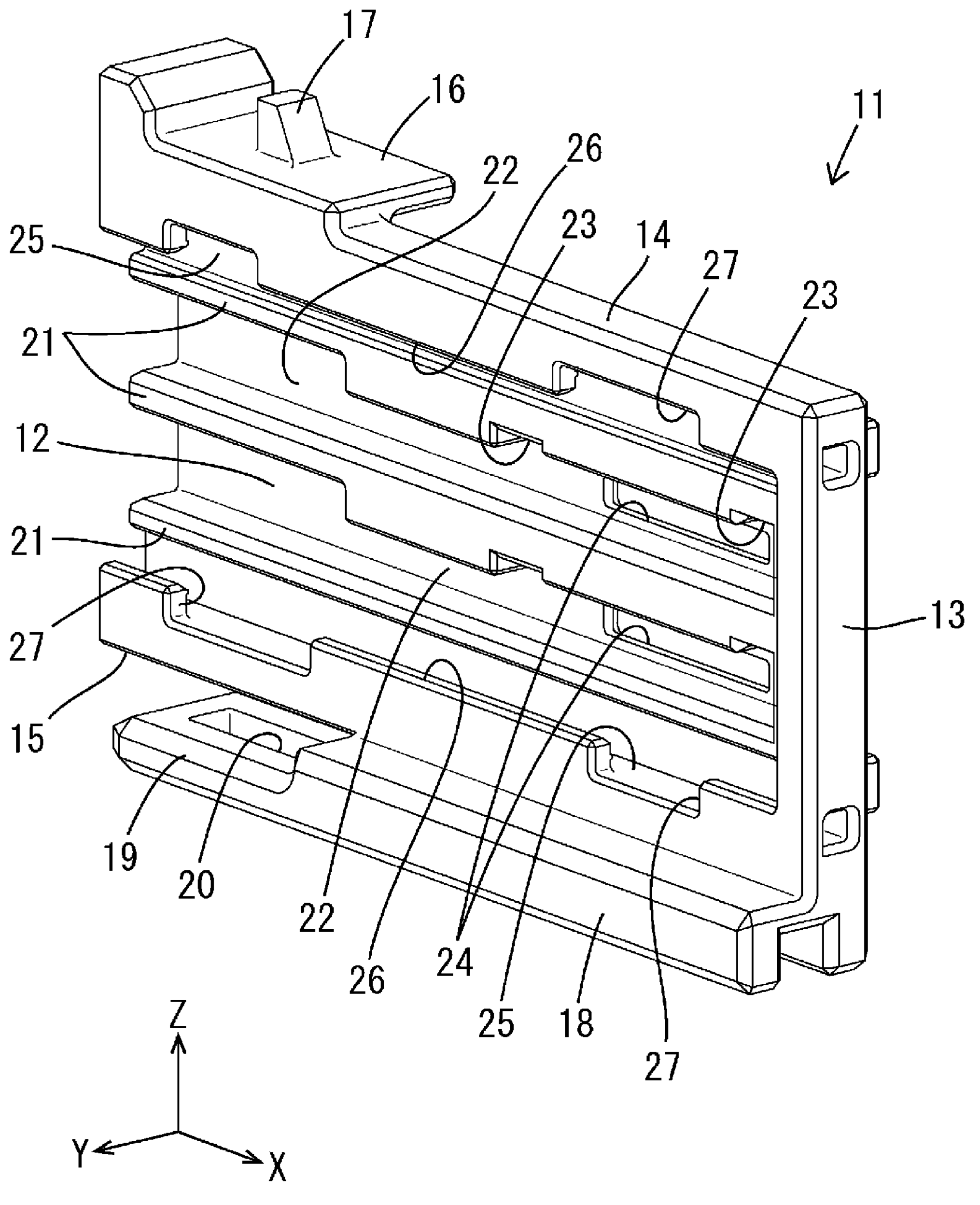
FIG. 4 is a perspective view of a first housing viewed diagonally from the top front right.
Figure 5:
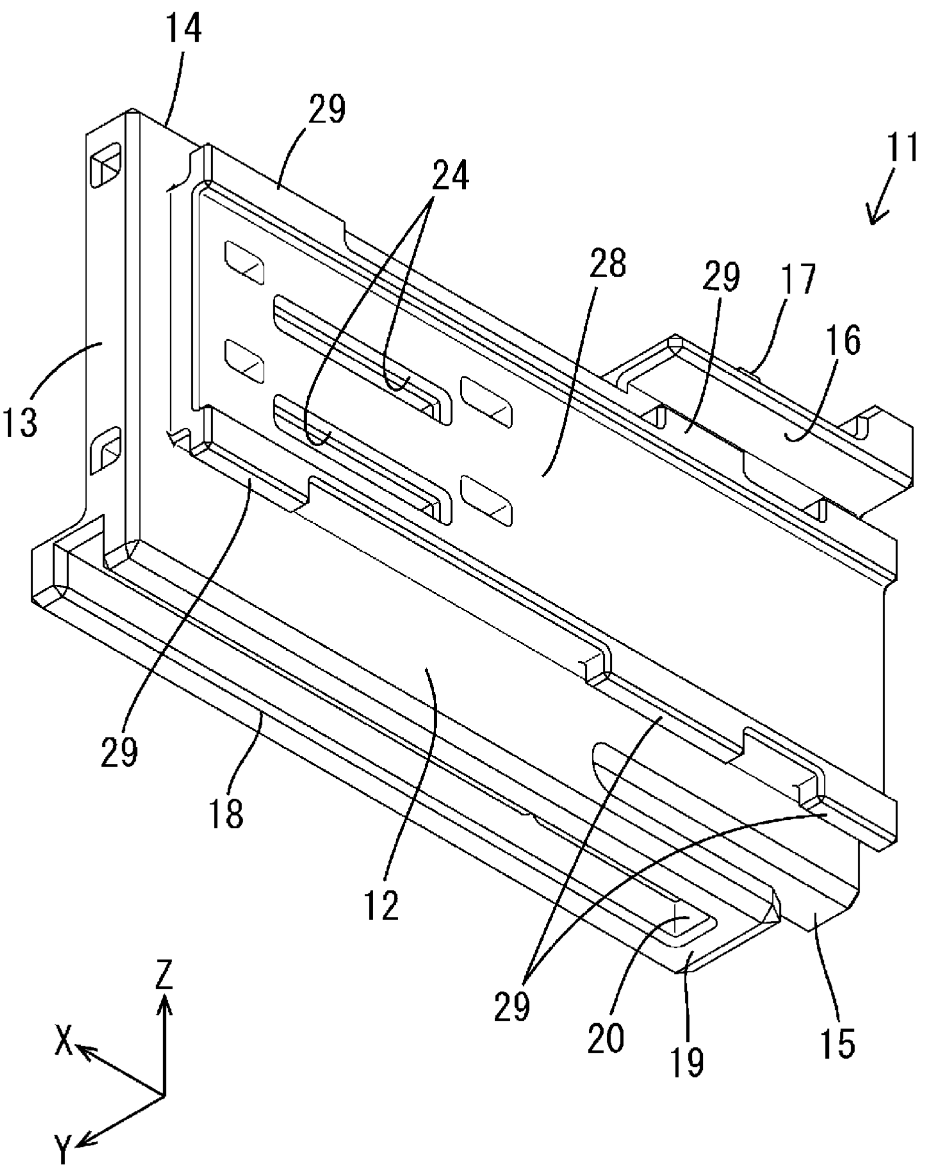
FIG. 5 is a perspective view of the first housing viewed diagonally from the bottom front left.

Each first housing 11 is a single component made of a synthetic resin. As shown in FIGS. 4 and 5, each first housing 11 has a flattened shape in which the width in the left-right direction is smaller than the depth in the front-rear direction and the height in the top-bottom direction. Each first housing 11 includes a first plate-shaped base portion 12 that is rectangular in a side view, a first front wall portion 13, a first upper wall portion 14, a first lower wall portion 15, a first widened portion 18, and a first elastic locking piece 19. The first front wall portion 13 is disposed along the front edge of the first plate-shaped base portion 12. A right-side portion of the first front wall portion 13 protrudes to the right from the first plate-shaped base portion 12, in a rib shape.

The first upper wall portion 14 is disposed along the upper edge of the first plate-shaped base portion 12. A right-side portion of the first upper wall portion 14 protrudes to the right from the first plate-shaped base portion 12, in a rib shape. A first protruding portion 16 is formed at a rear end portion of the first upper wall portion 14. A left-side portion of the first protruding portion 16 protrudes to the left from the first plate-shaped base portion 12. A first locking portion 17, which protrudes upward, is formed on the upper surface (outer surface) of the first protruding portion 16.

The first lower wall portion 15 is disposed along the lower edge of the first plate-shaped base portion 12. A right-side portion of the first lower wall portion 15 protrudes to the right from the first plate-shaped base portion 12, in a rib shape. The first widened portion 18 is disposed along the outer surface (lower surface) of the first lower wall portion 15. A right-side portion of the first widened portion 18 protrudes to the right relative to the first lower wall portion 15, in a rib shape. An area of the first widened portion 18 other than a rear end portion thereof is continuous with the outer surface of the first lower wall portion 15. The rear end portion of the first widened portion 18 functions as the first elastic locking piece 19. The first elastic locking piece 19 is spaced downward from the outer surface (lower surface) of the first lower wall portion 15, and has a shape that extends rearward in the manner of a cantilever. The first elastic locking piece 19 has a first locking hole 20, and can be elastically displaced downward, with the front end of the first elastic locking piece 19 serving as a supporting point.

Three first partition walls 21 are formed on the right surface of the first plate-shaped base portion 12 at intervals in the top-bottom direction. A pair of upper and lower first terminal housing portions 22 partitioned by the three first partition walls 21 are formed in the first plate-shaped base portion 12. Each first terminal housing portion 22 is elongated in the front-rear direction and has a cavity that is open to the right of the first housing 11. A pair of front and rear first positioning recesses 23 are formed in the upper surface of each first terminal housing portion 22. A pair of upper and lower first communication holes 24 that extend through the first plate-shaped base portion 12 in the left-right direction are formed in the first plate-shaped base portion 12. The upper first communication hole 24 is in communication with the upper first terminal housing portion 22. The lower first communication hole 24 is in communication with the lower first terminal housing portion 22.

A pair of upper and lower first guide grooves 25 that are elongated in the front-rear direction are formed in the right surface of the first plate-shaped base portion 12. The upper first guide groove 25 is constituted by the right surface of the first plate-shaped base portion 12, the first upper wall portion 14, and a first guide wall 26 that protrudes downward from the right edge of the first upper wall portion 14. The lower first guide groove 25 is constituted by the right surface of the first plate-shaped base portion 12, the first lower wall portion 15, and a first guide wall 26 that protrudes upward from the right edge of the first lower wall portion 15. The first guide wall 26 has two first notches 27 spaced apart from each other in the front-rear direction.

The first plate-shaped base portion 12 has a first thick portion 28 that extends to the left from the left surface of the first plate-shaped base portion 12. The upper surface of the first thick portion 28 has three first guide ribs 29 that protrude upward and are spaced apart from each other in the front-rear direction. The lower surface of the first thick portion 28 has three first guide ribs 29 that protrude downward and are spaced apart from each other in the front-rear direction.

(Second Housings 30)

Figure 6:
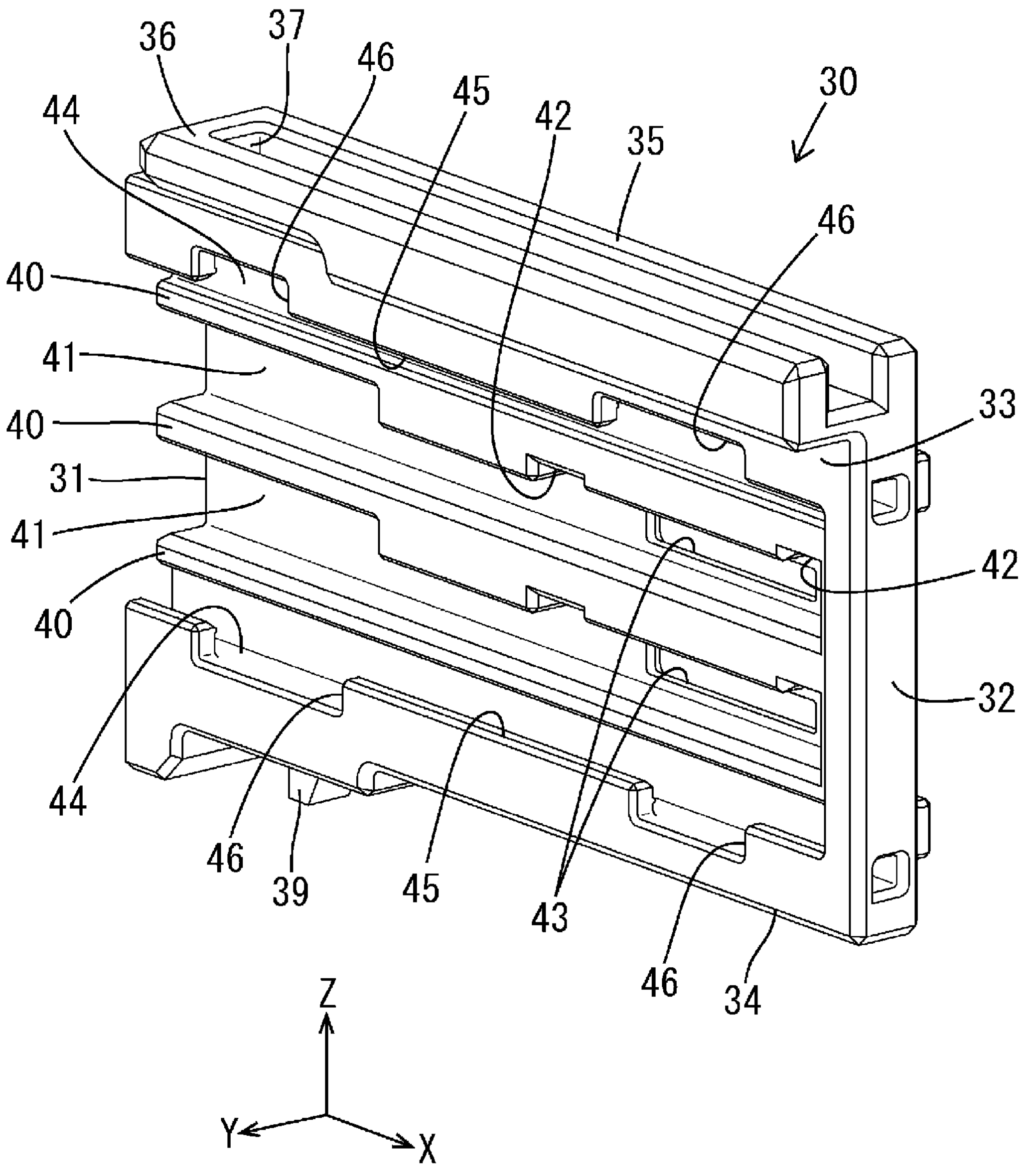
FIG. 6 is a perspective view of a second housing viewed diagonally from the top front right.
Figure 7:
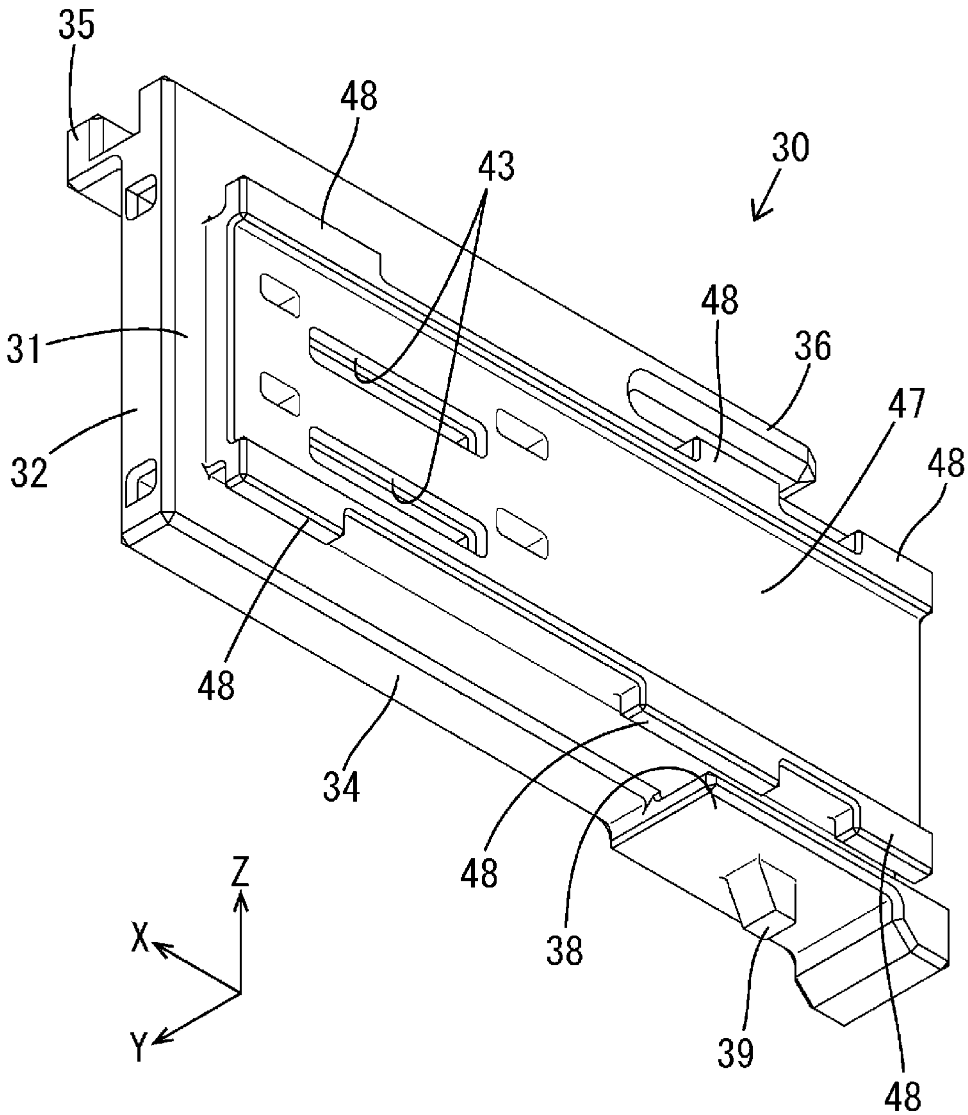
FIG. 7 is a perspective view of the second housing viewed diagonally from the bottom front left.

Each second housing 30 is a single component made of a synthetic resin. As shown in FIGS. 6 and 7, each second housing 30 has a flattened shape in which the width in the left-right direction is smaller than the depth in the front-rear direction and the height in the top-bottom direction. Each second housing 30 includes a second plate-shaped base portion 31, which is rectangular in a side view, a second front wall portion 32, a second upper wall portion 33, a second lower wall portion 34, a second widened portion 35, and a second elastic locking piece 36. The second front wall portion 32 is disposed along the front edge of the second plate-shaped base portion 31. A right-side portion of the second front wall portion 32 protrudes to the right from the second plate-shaped base portion 31, in a rib shape.

The second upper wall portion 33 is disposed along the upper edge of the second plate-shaped base portion 31. A right-side portion of the second upper wall portion 33 protrudes to the right from the second plate-shaped base portion 31, in a rib shape. The second widened portion 35 is disposed along the outer surface (upper surface) of the second upper wall portion 33. A right-side portion of the second widened portion 35 protrudes to the right relative to the second upper wall portion 33, in a rib shape. An area of the second widened portion 35 other than a rear end portion thereof is continuous with the outer surface of the second upper wall portion 33. The rear end portion of the second widened portion 35 functions as the second elastic locking piece 36. The second elastic locking piece 36 is spaced upward from the outer surface (lower surface) of the second upper wall portion 33, and has a shape that extends rearward in the manner of a cantilever. The second elastic locking piece 36 has a second locking hole 37, and can be elastically displaced upward, with the front end of the second elastic locking piece 36 serving as a supporting point.

The second lower wall portion 34 is disposed along the lower edge of the second plate-shaped base portion 31. A right-side portion of the second lower wall portion 34 protrudes to the right from the second plate-shaped base portion 31, in a rib shape. A second protruding portion 38 is formed on a rear end portion of the second lower wall portion 34. A left-side portion of the second protruding portion 38 protrudes to the left from the second plate-shaped base portion 31. A second locking portion 39 having a protruding shape, which protrudes downward, is formed on the lower surface (outer surface) of the second protruding portion 38.

The direction in which the first elastic locking piece 19 extends and the direction in which the second elastic locking piece 36 extends are the same (rearward). The position of the first elastic locking piece 19 of the first housing 11 and the position of the second elastic locking piece 36 of the second housing 30 are opposite to each other in the top-bottom direction. The position of the first locking portion 17 of the first housing 11 and the position of the second locking portion 39 of the second housing 30 are opposite to each other in the top-bottom direction.

Three second partition walls 40 are formed on the right surface of the second plate-shaped base portion 31 at intervals in the top-bottom direction. A pair of upper and lower second terminal housing portions 41 partitioned by the three second partition walls 40 are formed in the second plate-shaped base portion 31. A pair of front and rear second positioning recesses 42 are formed in the upper surface of each second terminal housing portion 41. Each second terminal housing portion 41 is elongated in the front-rear direction and has a cavity that is open to the right of the second housing 30. A pair of upper and lower second communication holes 43 that extend through the second plate-shaped base portion 31 in the left-right direction are formed in the second plate-shaped base portion 31. The upper second communication hole 43 is in communication with the upper second terminal housing portion 41. The lower second communication hole 43 is in communication with the lower second terminal housing portion 41.

A pair of upper and lower second guide grooves 44 that are elongated in the front-rear direction are formed in the right surface of the second plate-shaped base portion 31. The upper second guide groove 44 is constituted by the right surface of the second plate-shaped base portion 31, the second upper wall portion 33, and a second guide wall 45 that protrudes downward from the right edge of the second upper wall portion 33. The lower second guide groove 44 is constituted by the right surface of the second plate-shaped base portion 31, the second lower wall portion 34, and a second guide wall 45 that protrudes upward from the right edge of the second lower wall portion 34. Each second guide wall 45 has two second notches 46 spaced apart from each other in the front-rear direction.

The second plate-shaped base portion 31 has a second thick portion 47 that extends to the left from the left surface of the second plate-shaped base portion 31. The upper surface of the second thick portion 47 has three second guide ribs 48 that protrude upward and are spaced apart from each other in the front-rear direction. The lower surface of the second thick portion 47 has three second guide ribs 48 that protrude downward and are spaced apart from each other in the front-rear direction.

(First Cover 50)

The first cover 50 is a single component made of a synthetic resin. As shown in FIG. 2, the first cover 50 has a plate shape in which the width in the left-right direction is smaller than the depth in the front-rear direction and the height in the top-bottom direction. The first cover 50 includes a first substrate portion 51 that is rectangular in a side view, an upper edge portion 52, the first lower wall portion 15, the first widened portion 18, and the first elastic locking piece 19. The upper edge portion 52 has an elongated shape in the front-rear direction, and is disposed along the upper edge of the first substrate portion 51. A right-side portion of the upper edge portion 52 protrudes to the right from the first substrate portion 51.

The first lower wall portion 15 of the first cover 50 has the same shape as the first lower wall portion 15 of each first housing 11, and is disposed along the lower edge of the first substrate portion 51. The shape of the first widened portion 18 in the first cover 50 and the positional relationship between the first widened portion 18 and the first lower wall portion 15 are the same as those in each first housing 11. The rear end portion of the first widened portion 18 functions as the first elastic locking piece 19. The shape of the first elastic locking piece 19 in the first cover 50, the positional relationship between the first elastic locking piece 19 and the first widened portion 18, and the positional relationship between the first elastic locking piece 19 and the first lower wall portion 15 are the same as those in each first housing 11. The first guide grooves 25, the first guide walls 26, and the first notches 27 are formed in the right surface of the first substrate portion 51. The first guide grooves 25, the first guide walls 26, and the first notches 27 of the first cover 50 have the same shapes as the first guide grooves 25, the first guide walls 26, and the first notches 27 of the first housings 11, respectively.

(Second Cover 53)

Figure 3:
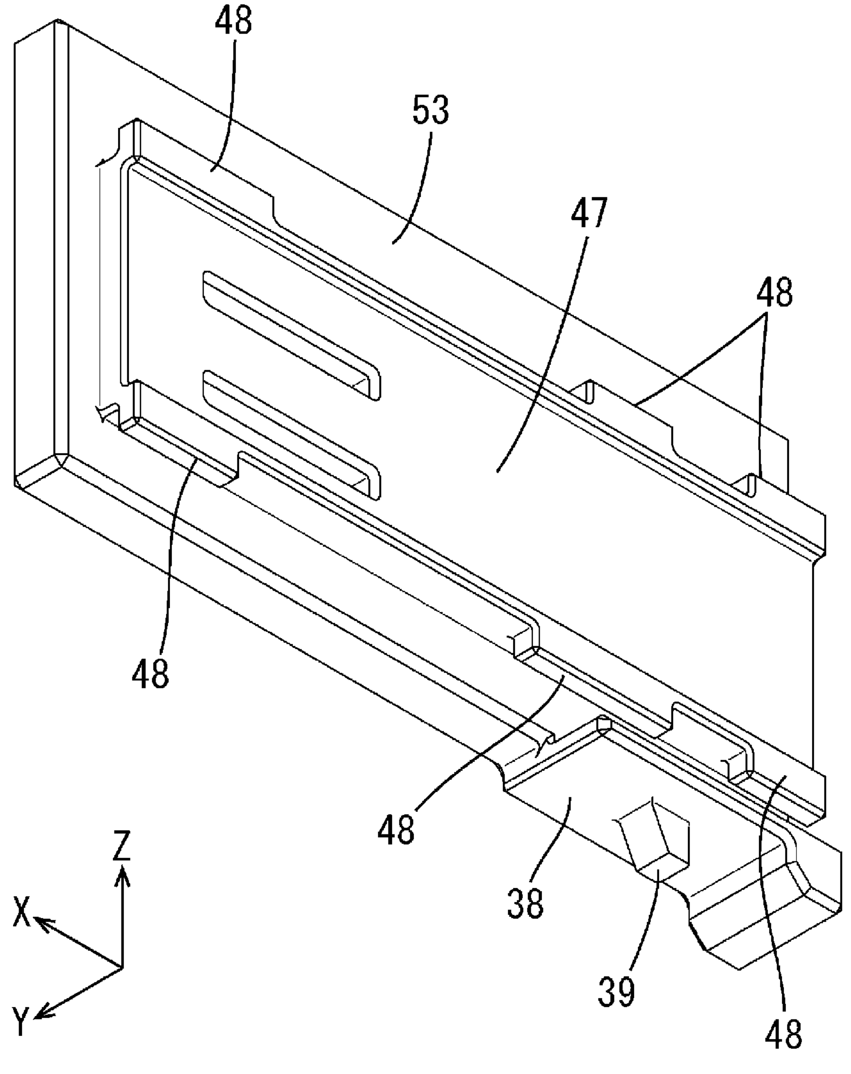
FIG. 3 is a perspective view of a second cover viewed diagonally from the bottom front left.

The second cover 53 is a single component made of a synthetic resin. As shown in FIGS. 2 and 3, the second cover 53 has a plate shape in which the width in the left-right direction is smaller than the depth in the front-rear direction and the height in the top-bottom direction. A second protruding portion 38 is formed at a rear end portion of the lower edge of the second cover 53. A left-side portion of the second protruding portion 38 protrudes to the left from the second plate-shaped base portion 31. A second locking portion 39 having a protruding shape is formed on the lower surface (outer surface) of the second protruding portion 38. The second protruding portion 38 and the second locking portion 39 of the second cover 53 have the same shapes as the second protruding portion 38 and the second locking portion 39 of the second housings 30, respectively. The second cover 53 has a second thick portion 47 that extends to the left from the left surface of the second cover 53. Second guide ribs 48 that have the same shape as the second guide ribs 48 of the second housings 30 are formed on the upper and lower surfaces of the second thick portion 47.

(Terminal Fittings 60)

Figure 8:
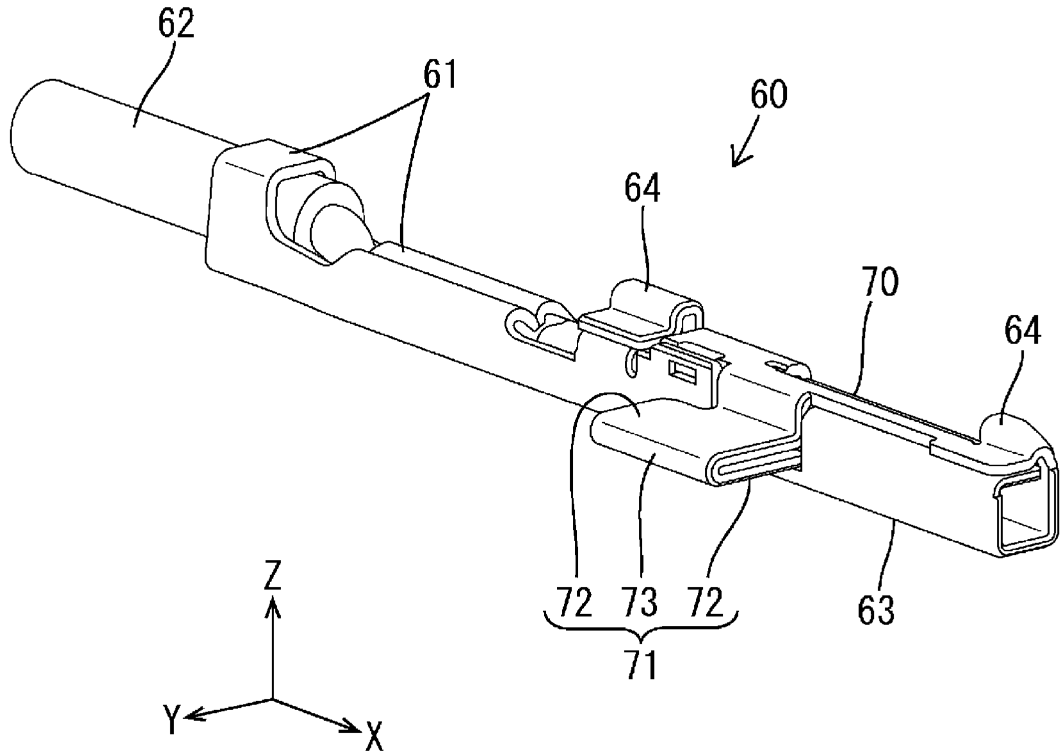
FIG. 8 is a perspective view of a terminal fitting viewed diagonally from the top front right.
Figure 9:
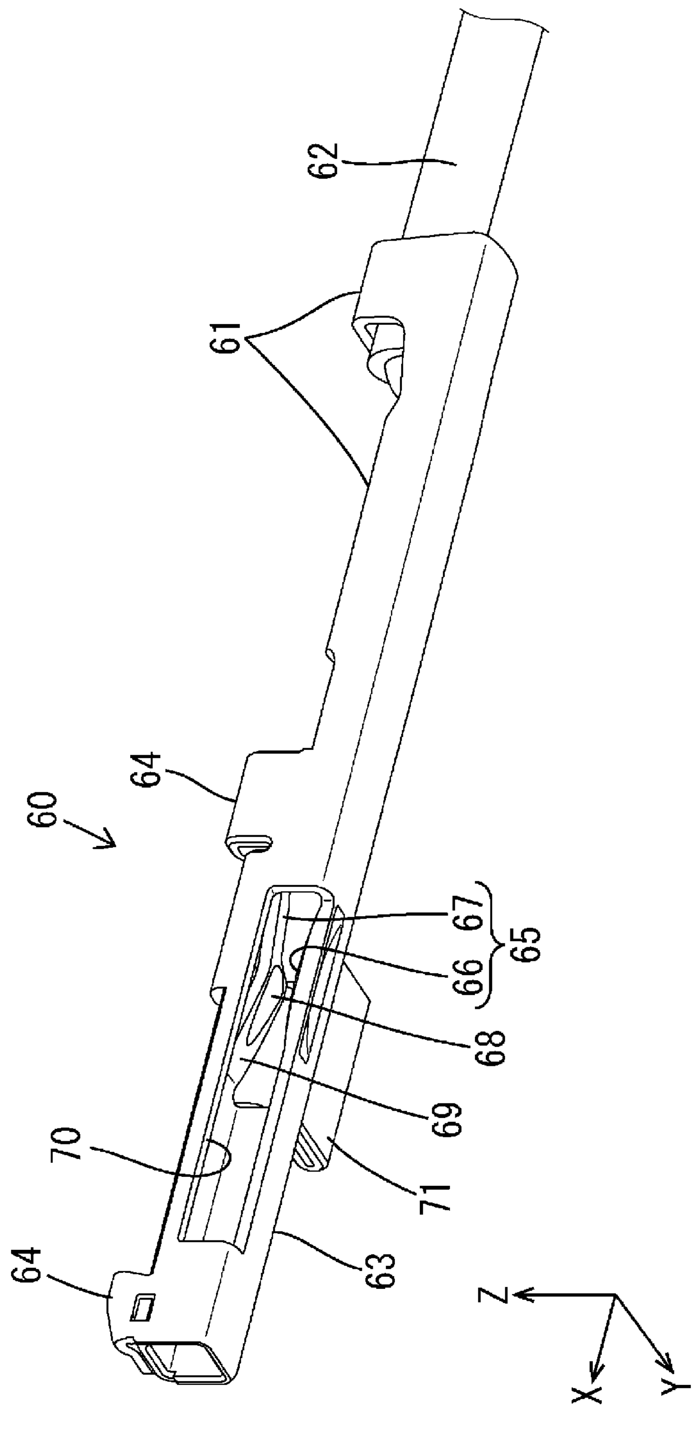
FIG. 9 is a perspective view of the terminal fitting viewed diagonally from the bottom front left.

Each terminal fitting 60 is a single component formed by, for example, bending a metal plate member. As shown in FIGS. 8 and 9, each terminal fitting 60 has an elongated shape in the front-rear direction as a whole. An open barrel-shaped crimp portion 61 is formed in a rear end-side area of each terminal fitting 60. The terminal fitting 60 and an electric wire 62 are connected to each other by crimping the crimp portion 61 to the front end of the electric wire 62.

A terminal body portion 63 that has a square tubular shape is formed in a front end-side area of each terminal fitting 60. A pair of front and rear positioning protrusions 64 that each have a protruding shape are formed on the terminal body portion 63. The pair of positioning protrusions 64 protrude upward from a front end portion and a rear end portion of the upper surface of the terminal body portion 63.

A connecting portion 65 is provided in the terminal body portion 63. The connecting portion 65 is constituted by a pressure receiving portion 66 and an elastic contact piece 67. The pressure receiving portion 66 is a portion formed by hammering out a portion of a lower plate portion included in the terminal body portion 63 so as to protrude upward. The pressure receiving portion 66 is rigid to the extent that the pressure receiving portion 66 does not easily deform when connected to a protrusion 71, which will be described later.

The elastic contact piece 67 is disposed inside the terminal body portion 63. In a side view of each terminal fitting 60 viewed in the left-right direction (the stacking direction), the elastic contact piece 67 has a valley-like bent shape so as to protrude downward. A contact portion 68 is formed at a lower end portion of the elastic contact piece 67. The contact portion 68 is disposed so as to face the pressure receiving portion 66 in the top-bottom direction. An area of the lower surface of the elastic contact piece 67 forward of the contact portion 68 functions as a guide surface 69 that is inclined so as to increase the height thereof in a forward direction. The elastic contact piece 67 can be elastically deformed in such a manner as to displace the contact portion 68 upward.

An opening 70 bringing the inside and outside of the terminal body portion 63 into communication with each other is formed in a left side plate portion included in the terminal body portion 63. The opening 70 has an elongated slit shape in the front-rear direction. The range in which the opening 70 is formed in the front-rear direction is the range from a position located forward of the front end of the elastic contact piece 67 (the guide surface 69) to a position located rearward of the contact portion 68. In a side view of each terminal fitting 60 viewed from the right side, the contact portion 68, the guide surface 69, and the pressure receiving portion 66 are exposed to the left side of the terminal body portion 63 through the opening 70.

A protrusion 71 that protrudes to the right relative to the right outer surface of the terminal body portion 63 is formed on the terminal body portion 63. The protrusion 71 has a bent shape formed by folding a horizontal plate-shaped portion along a fold line extending in the front-rear direction. The protrusion 71 includes a pair of upper and lower horizontal plate portions 72 and a bent portion 73 that has a semicircular arc cross section and connects the protruding edges of the two horizontal plate portions 72 to each other. The protrusion 71 and the contact portion 68 are disposed in the same area in the front-rear direction. The protrusion 71 is provided rearward of the front end of the guide surface 69. The thickness of the protrusion 71 in the top-bottom direction is larger than the distance between the contact portion 68 and the pressure receiving portion 66 facing each other in a free state where the elastic contact piece 67 is not elastically deformed.

<Procedure for Assembling Joint Connector>

Figure 10:
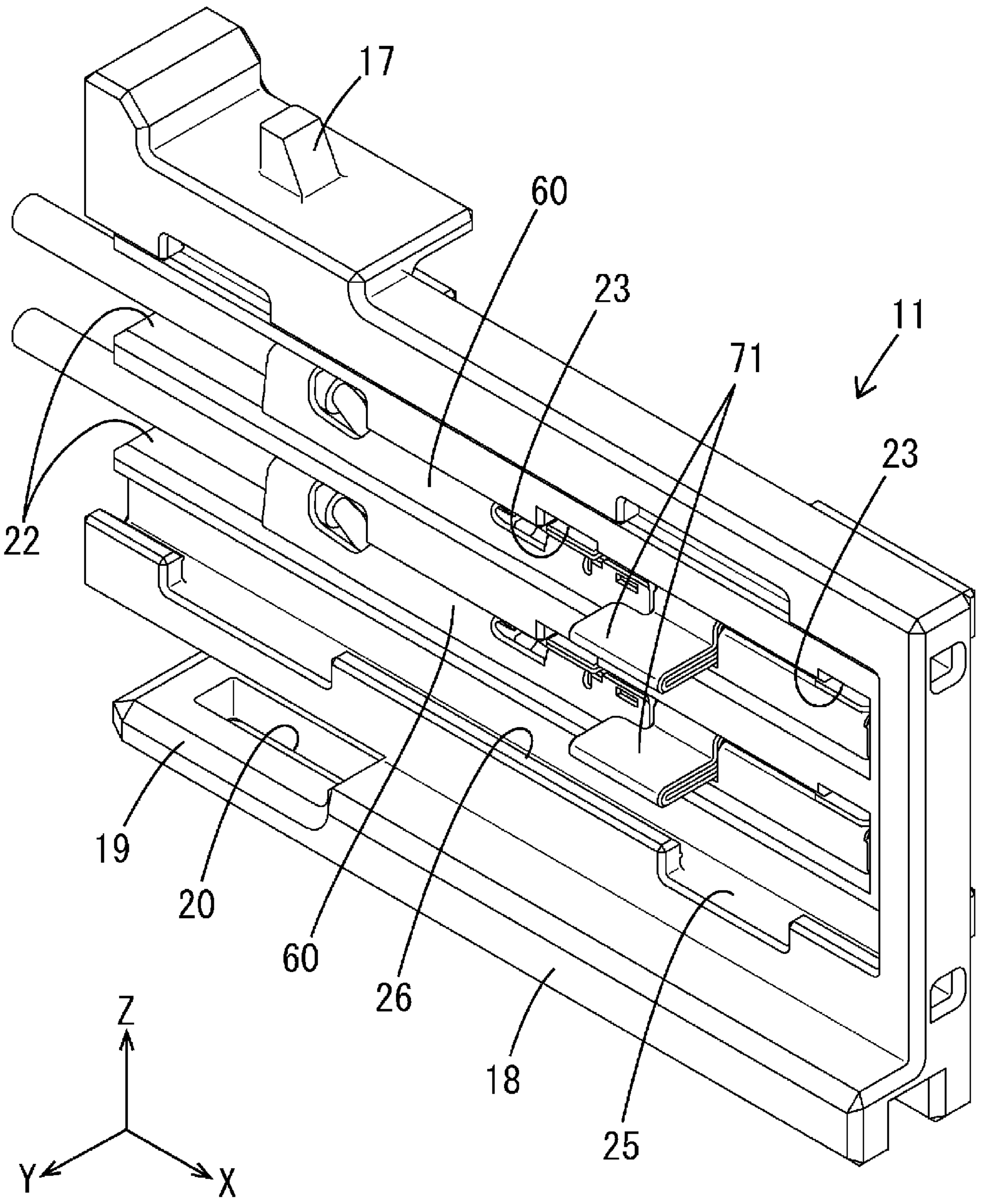
FIG. 10 is a perspective view of the first housing to which terminal fittings are attached, viewed diagonally from the top front right.
Figure 11:
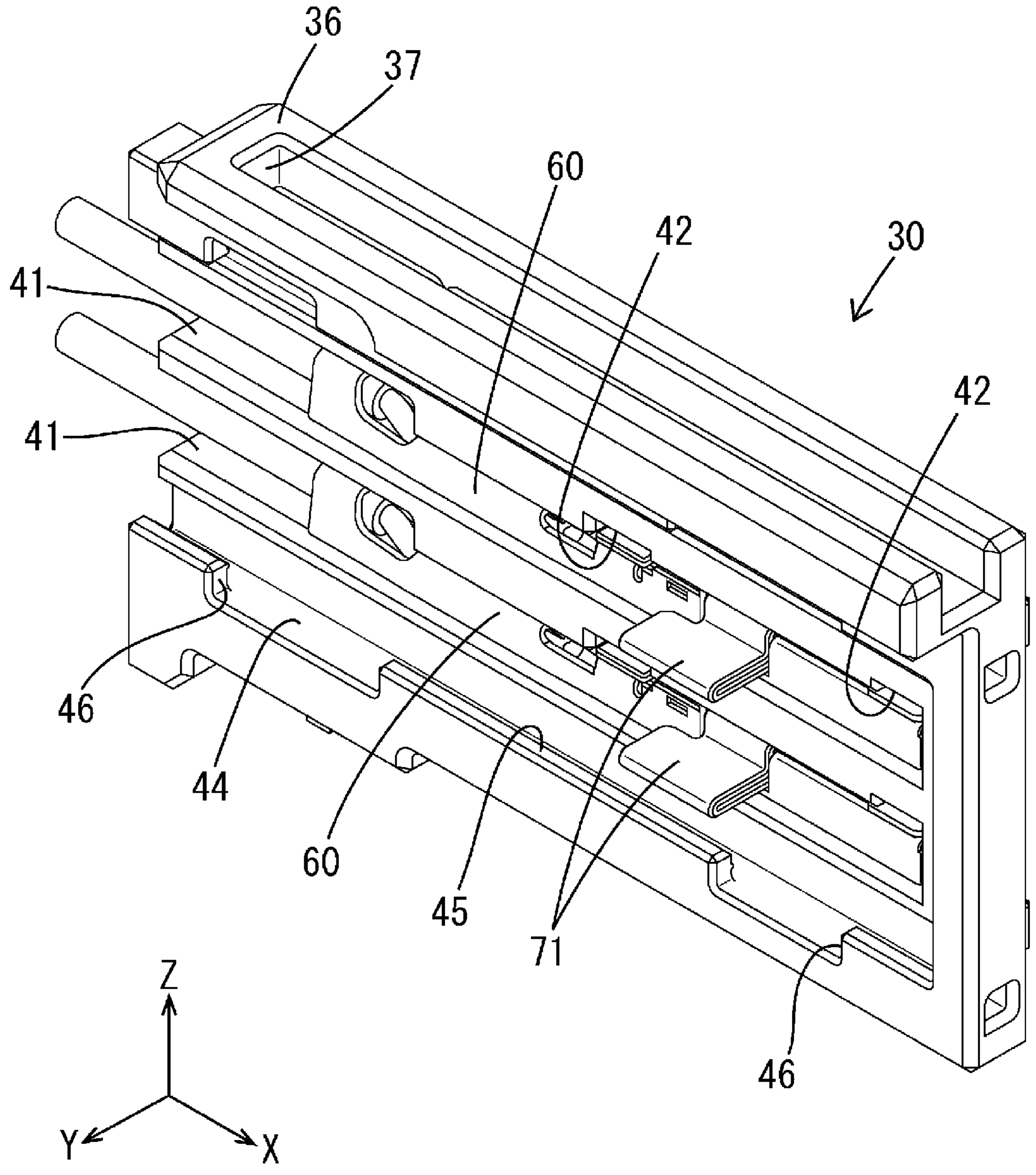
FIG. 11 is a perspective view of the second housing to which terminal fittings are attached, viewed diagonally from the top front right.

As shown in FIGS. 10 and 11, terminal fittings 60 are housed in the first terminal housing portions 22 and thereby attached to the first housing 11, and terminal fittings 60 are housed in the second terminal housing portions 41 and thereby attached to the second housing 30. The positioning protrusions 64 are fitted into the first positioning recesses 23 or the second positioning recesses 42, and thus the attached terminal fittings 60 are positioned with respect to the first housing 11 or the second housing 30 in the front-rear direction. Fitting between the positioning protrusions 64 and the first positioning recesses 23 or the second positioning recesses 42 keeps the terminal fittings 60 attached to the first housing 11 or the second housing 30. The attached terminal fittings 60 are exposed on the right side of the first housing 11 or the second housing 30. The protrusions 71 protrude to the right relative to the right outer surface of the first housing 11 or the second housing 30.

Figure 12:
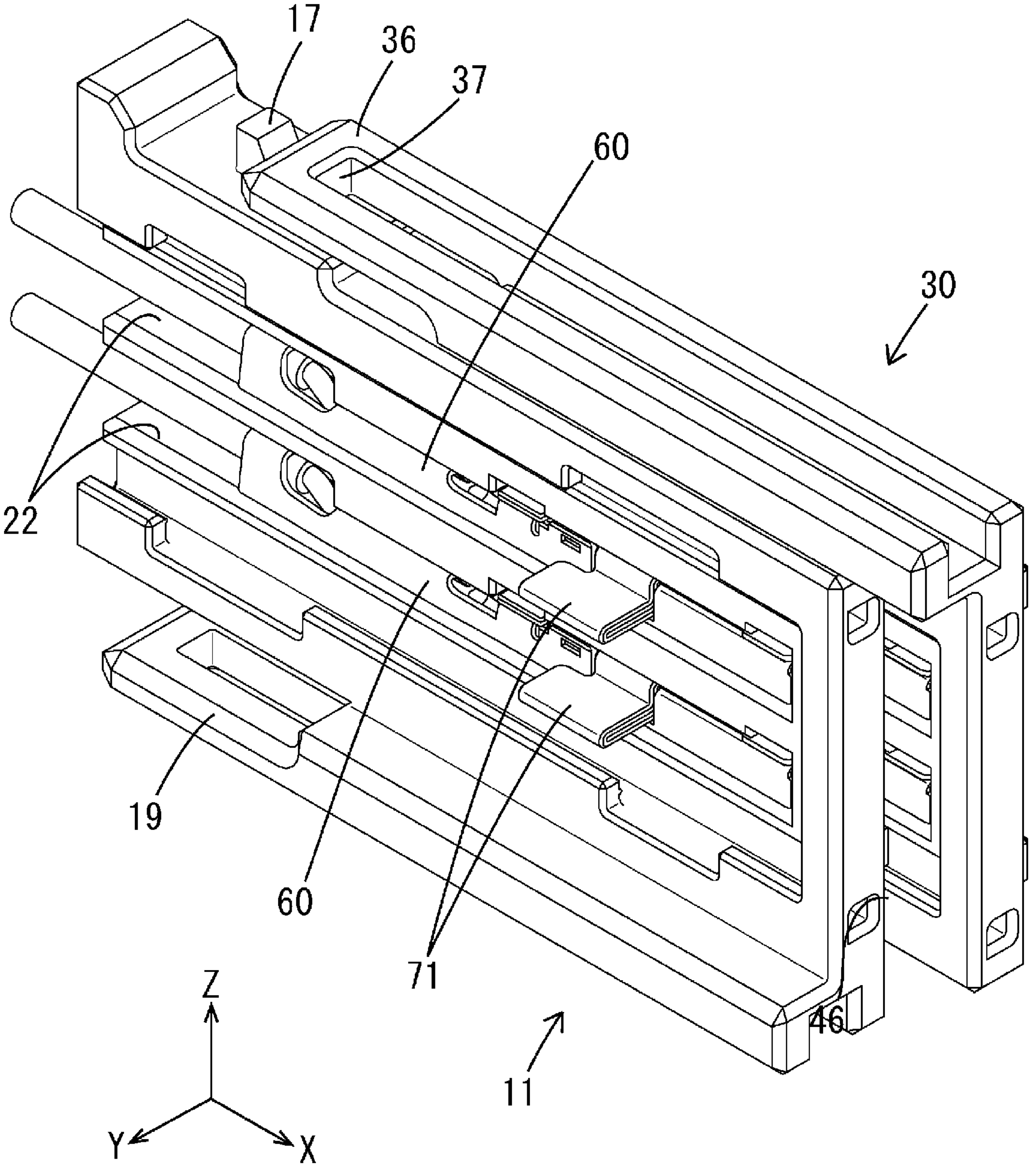
FIG. 12 is a perspective view of the first housing and the second housing in a temporarily assembled state, viewed diagonally from the top front right.
Figure 13:
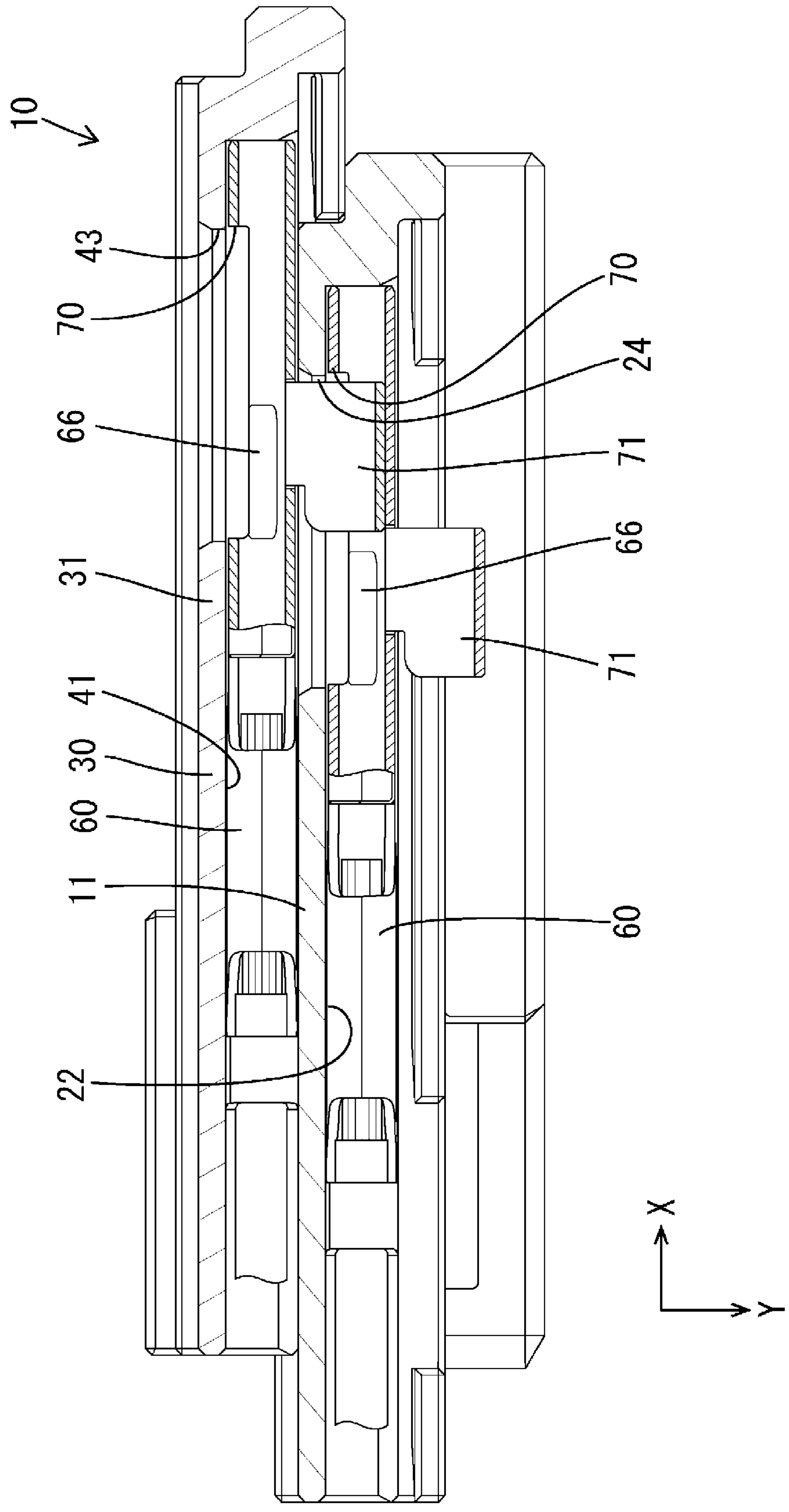
FIG. 13 is a plan cross-sectional view of the first housing and the second housing in a temporarily assembled state taken horizontally and viewed from above.

Next, the first housing 11 and the second housing 30 are attached to each other. At this time, as shown in FIGS. 12 and 13, the first housing 11 is disposed on the right side, and the second housing 30 is disposed on the left side with the second housing 30 disposed slightly forward of the first housing 11. While maintaining this positional relationship, the first housing 11 and the second housing 30 are brought closer to each other in the left-right direction, and the first guide ribs 29 are inserted into the second guide grooves 44 via the second notches 46 of the second guide wall 45. This state is referred to as a temporarily assembled state of the two housings 11 and 30.

Figure 14:
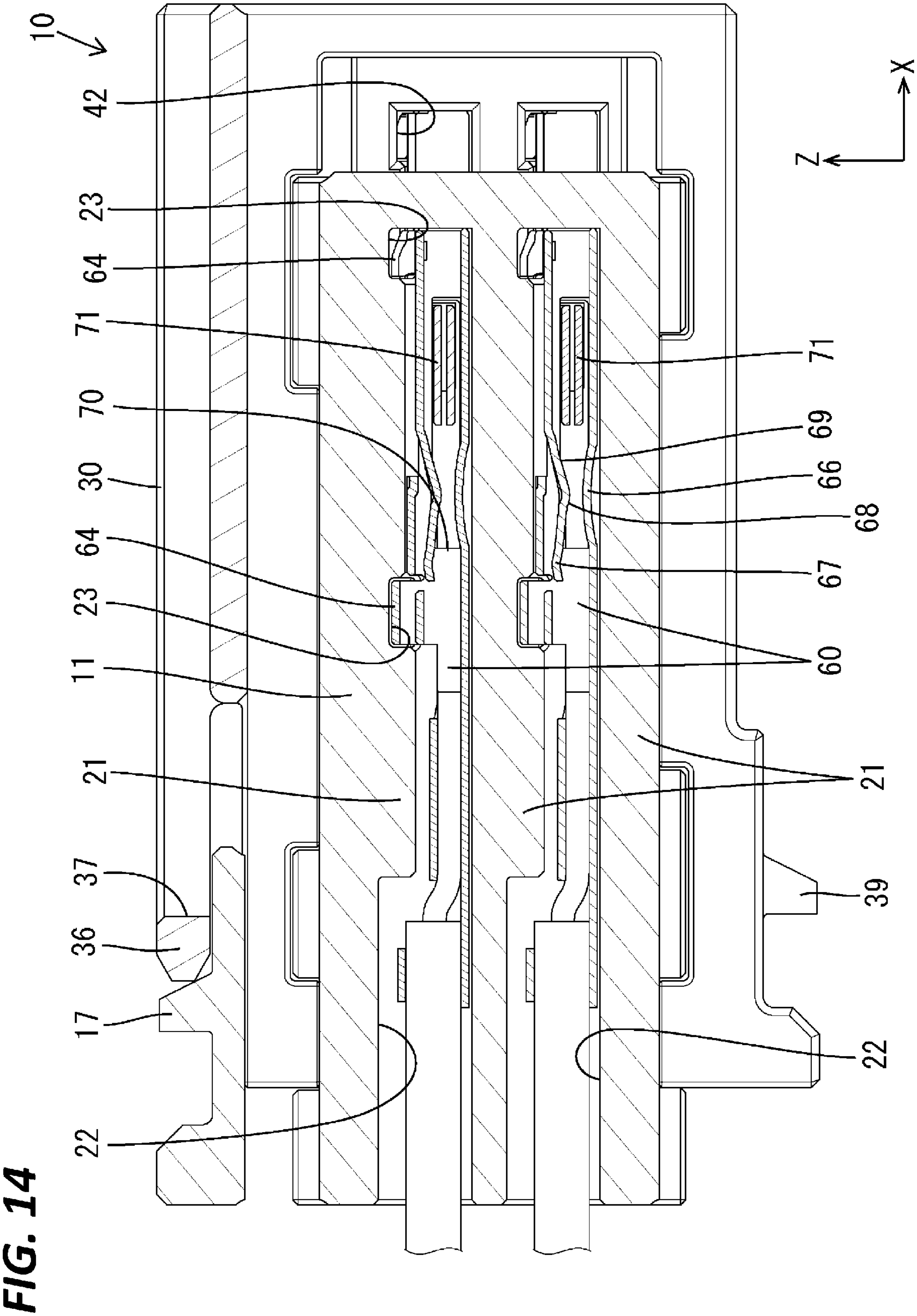
FIG. 14 is a side cross-sectional view of the first housing and the second housing in a temporarily assembled state taken in a direction orthogonal to a stacking direction and viewed from the right.
Figure 15:
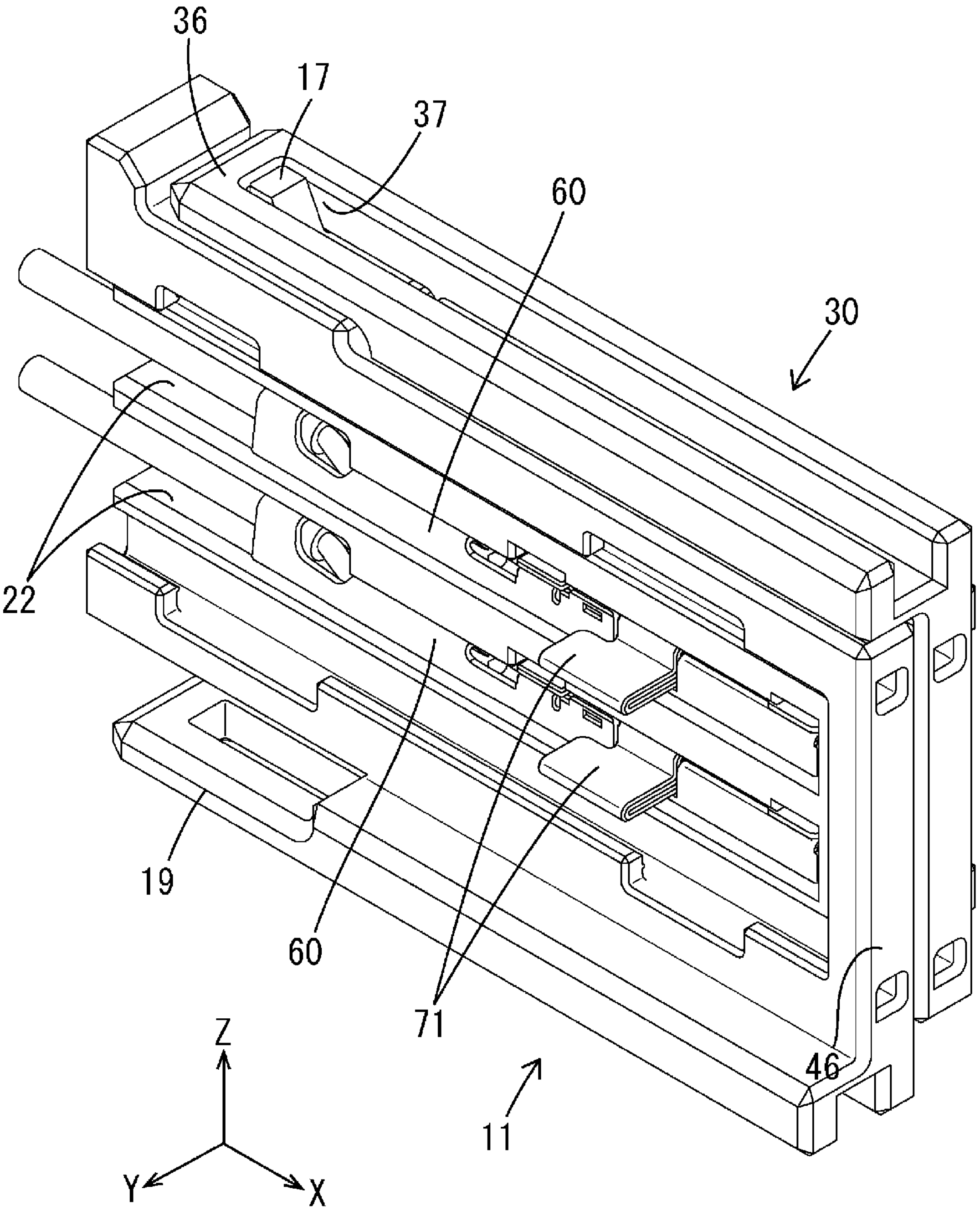
FIG. 15 is a perspective view of the first housing and the second housing in an assembled state, viewed diagonally from the top front right.
Figure 16:
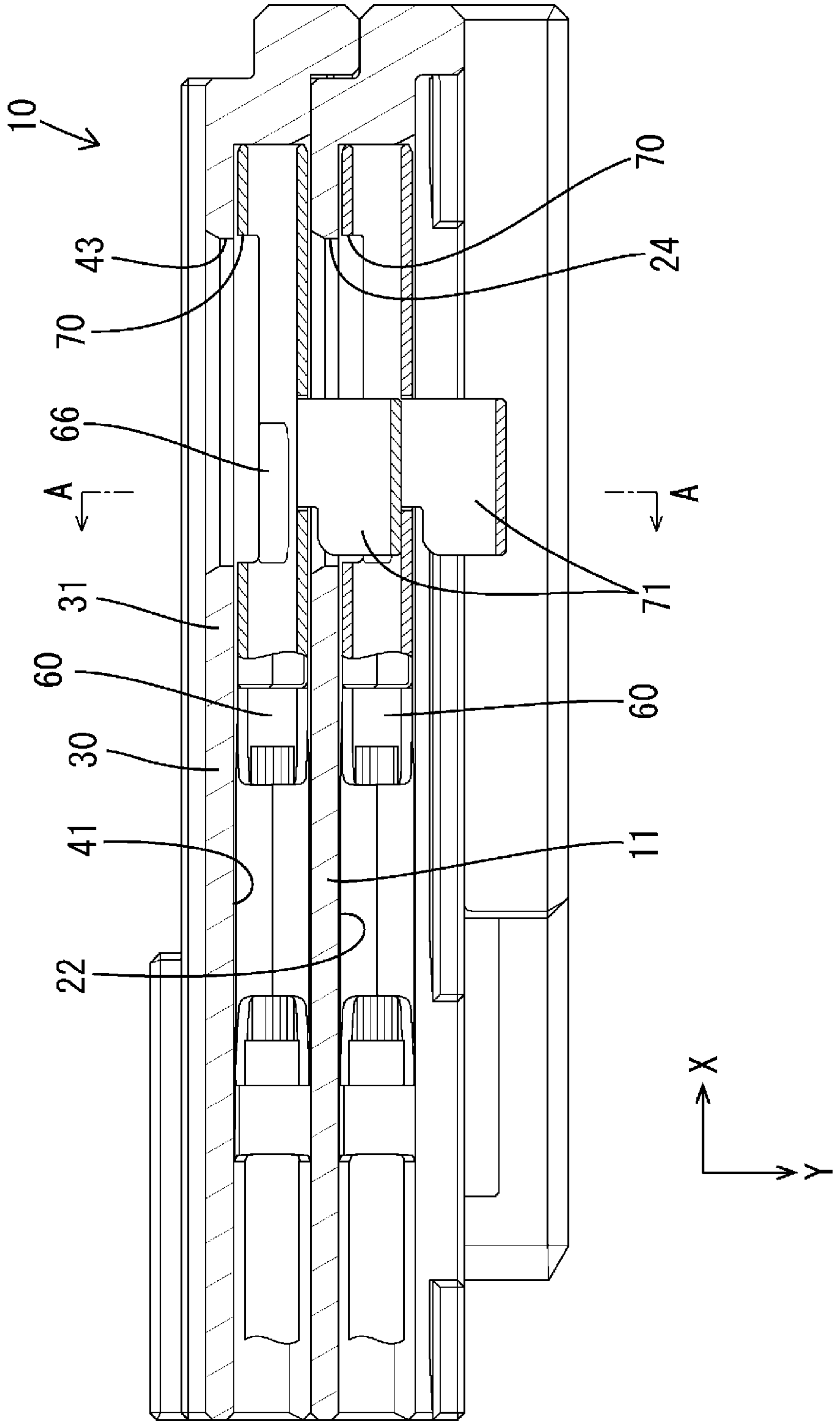
FIG. 16 is a plan cross-sectional view of the first housing and the second housing in an assembled state taken horizontally and viewed from above.

As shown in FIG. 13, when the two housings 11 and 30 are in the temporarily assembled state, the protrusions 71 of the terminal fittings 60 attached to the second housing 30 extend through the first communication holes 24 of the first housing 11 and the openings 70 of the terminal fittings 60 attached to the first housing 11, and enter the terminal body portions 63 of the terminal fittings 60 in the first terminal housing portions 22. As shown in FIG. 14, in each terminal body portion 63, the protrusion 71 is located forward of the contact portion 68 of the elastic contact piece 67. The protrusion 71 does not come into contact with the elastic contact piece 67. The rear end portion of the second elastic locking piece 36 is disposed forward of the first locking portion 17 so as to be adjacent thereto.

Next, the second housing 30 is slid rearward from the temporarily assembled state relative to the first housing 11. In the process of relatively moving the two housings 11 and 30 in the front-rear direction, the first guide ribs 29 housed in the second guide grooves 44 slide in contact with the second guide walls 45, thereby exhibiting a guiding function. This guiding function restricts the two housings 11 and 30 from separating in the left-right direction (i.e., the stacking direction), and also restricts the two housings 11 and 30 from moving relative to each other in the top-bottom direction (i.e., a direction orthogonal to the stacking direction).

Figure 17:
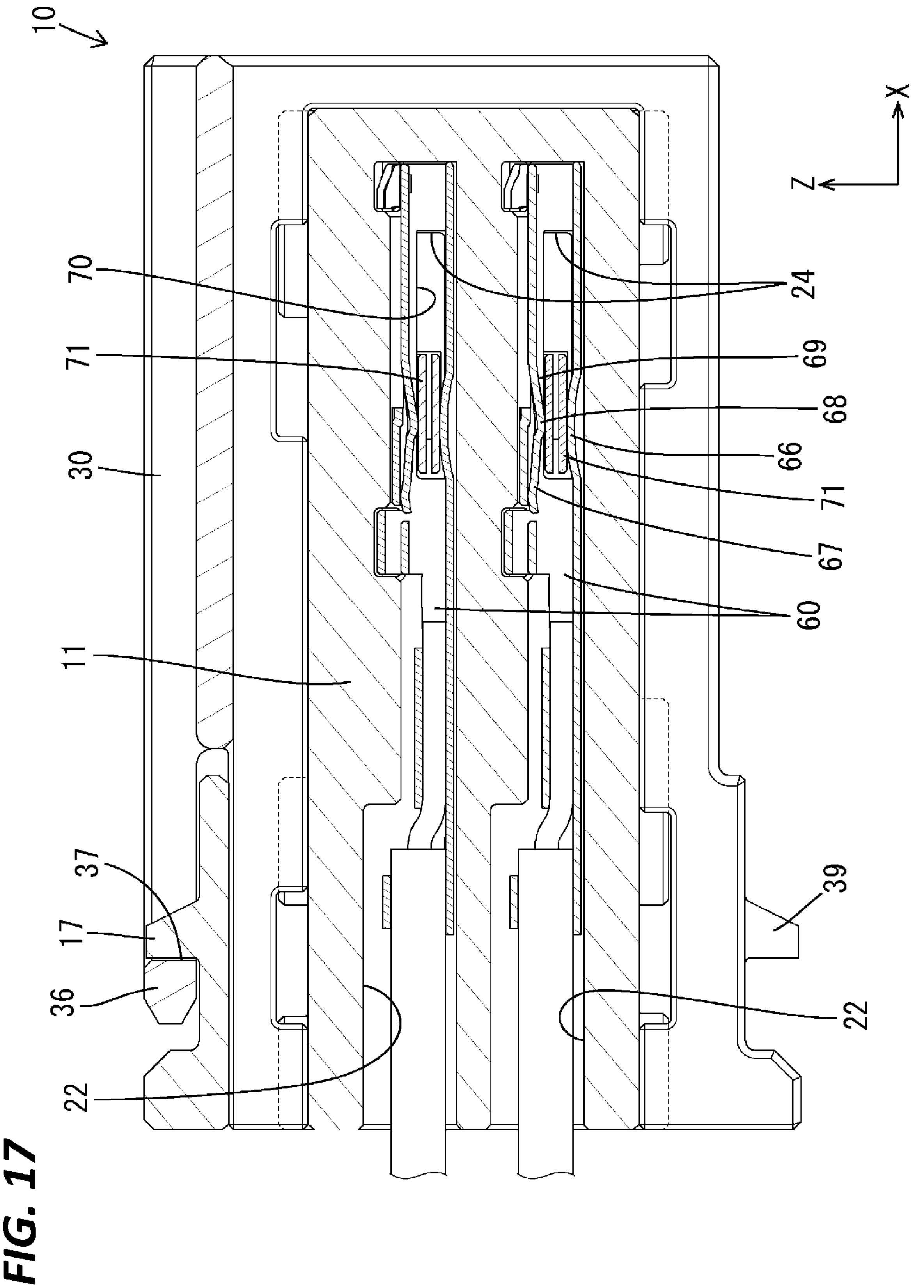
FIG. 17 is a side cross-sectional view of the first housing and the second housing in an assembled state taken in a direction orthogonal to the stacking direction and viewed from the right.

As the two housings 11 and 30 move relative to each other, the second elastic locking piece 36 moves up onto the first locking portion 17 and is elastically deformed upward. When the two housings 11 and 30 reach the proper assembled state, the second elastic locking piece 36 elastically returns to its original state, and the second locking hole 37 of the second elastic locking piece 36 and the first locking portion 17 are fitted to each other as shown in FIG. 17. As a result of this fitting, the two housings 11 and 30 are locked to each other in the proper assembled state.

Figure 18:
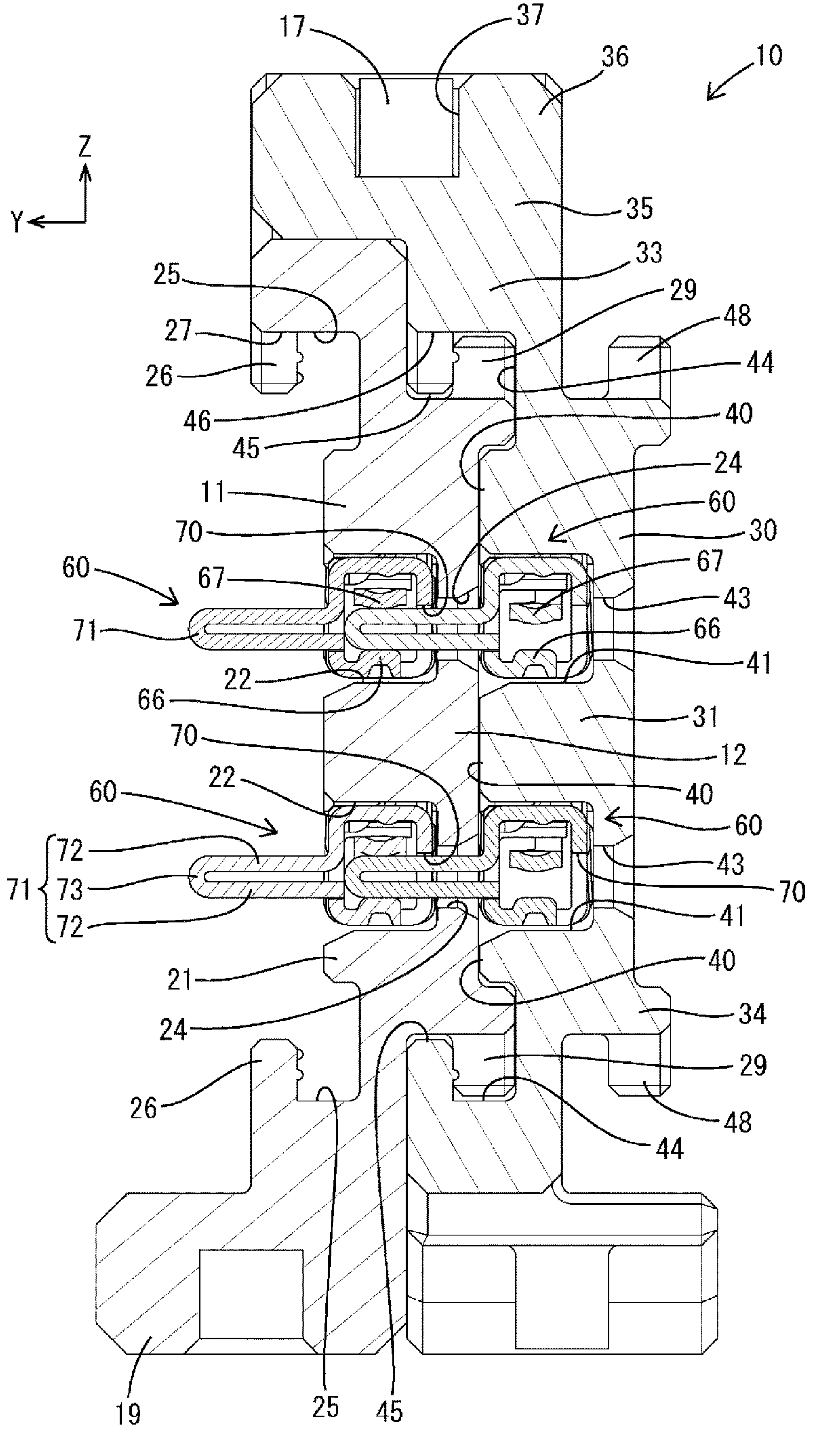
FIG. 18 is a cross-sectional view taken along the line A-A in FIG. 16.

In the process in which the state of the two housings 11 and 30 is changed from the temporarily assembled state to the proper assembled state, the protrusions 71 of the terminal fittings 60 attached to the second housing 30 slide in contact with the guide surfaces 69 of the elastic contact pieces 67 of the terminal fittings 60 attached to the first housing 11 and enter the gaps between the elastic contact pieces 67 and the pressure receiving portions 66. During this process, the amount of elastic deformation of each elastic contact piece 67 increases. As shown in FIGS. 17 and 18, when the two housings 11 and 30 reach the proper assembled state, the protrusions 71 come into contact with the contact portions 68, and the terminal fittings 60 of the first housing 11 and the terminal fittings 60 of the second housing 30 are connected to each other in direct contact.

After one pair of a first housing 11 and a second housing 30 are attached to each other as described above, the remaining first housing 11 and second housing 30 are attached in the same manner. After two pairs of a first housing 11 and a second housing 30 have been attached, the first housing 11 of one of the pairs and the second housing 30 of the other of the pairs are attached to each other. In this assembly process, a guiding function is exhibited by the guide grooves of the first housing 11 and the guide ribs of the second housing 30, and the first elastic locking piece 19 of the first housing 11 and the second locking portion 39 of the second housing 30 are fitted to each other so that the two housings 11 and 30 are locked to each other in the proper assembled state.

In the state where the two housings 11 and 30 are attached to each other, the protrusions 71 of the terminal fittings 60 attached to the first housing 11 on the left side extend through the second communication holes 43 of the second housing 30 on the right side and enter the terminal body portions 63 of the terminal fittings 60 attached to this second housing 30. In each terminal body portion 63, the protrusion 71 of the first housing 11 enters the gap between the elastic contact piece 67 and the pressure receiving portion 66 of the second housing 30, and thus the terminal fittings 60 of the two housings are connected to each other. Through the above procedure, the four terminal fittings 60 lined up in the stacking direction are connected without using another conductive member.

After a pair of first housings 11 and a pair of second housings 30 are attached to each other in a stacked state, the second cover 53 is attached to the first housing 11 located at the right end in the stacking direction. During attachment, the first housing 11 and the second cover 53 are brought into a temporarily assembled state by the same procedure as when the first housing 11 and the second housing 30 are attached to each other. Thereafter, while a guiding function is exhibited by the first guide grooves 25 and first guide walls 26 of the first housing 11 and the second guide ribs 48 of the second cover 53, the first housing 11 and the second cover 53 are moved in the front-rear direction relative to each other. As a result of this relative movement, the first elastic locking piece 19 of the first housing 11 and the second locking portion 39 of the second cover 53 are fitted to each other, and the first housing 11 and the second cover 53 are locked to each other in the proper assembled state.

Next, the first cover 50 is attached to the second housing 30 located at the left end in the stacking direction. During attachment, the second housing 30 and the first cover 50 are brought into a temporarily assembled state by the same procedure as when the first housing 11 and the second housing 30 are attached to each other. Thereafter, a guiding function is exhibited by the first guide grooves 25 and first guide walls 26 of the first cover 50 and the second guide ribs 48 of the second housings 30, and the second housing 30 and the first cover 50 are moved in the front-rear direction relative to each other. As a result of this relative movement, the first elastic locking piece 19 of the first cover 50 and the second locking portion 39 of the second housing 30 are fitted to each other, and the second housing 30 and the first cover 50 are locked to each other in the proper assembled state. Through the above procedure, assembly of the joint connector is complete.

The procedure for assembling the joint connector is not limited to the above procedure. The order of attaching the first housing 11 and the second housing 30, the first housing 11 and the second cover 53, and the second housing 30 and the first cover 50 can be changed or set as necessary.

Effects of First Embodiment

The joint connector according to the first embodiment includes a plurality of first housings 11 and a plurality of second housings 30 that are stacked and attached to each other. Each first housing 11 is provided with first communication holes 24 that are in communication with the internal spaces of the first terminal housing portions 22 from the outer surface of the first housing 11. Each second housing 30 is provided with second communication holes 43 that are in communication with the internal spaces of the second terminal housing portions 41 from the outer surface of the second housing 30.

Each first housing 11 is provided with first terminal housing portions 22 and each second housing 30 is provided with second terminal housing portions 41. The joint connector includes a connection structure for connecting the terminal fittings 60 housed in and attached to the first terminal housing portions 22 and the terminal fittings 60 housed in and attached to the second terminal housing portions 41 to each other.

This connection structure is for arranging a plurality of terminal fittings 60 so as to be arranged side by side in one direction (the stacking direction of the stacked housing 10) and connecting the arranged terminal fittings 60 to each other. Each terminal fitting 60 includes a terminal body portion 63 that has a square tubular shape. A connecting portion 65 is provided in the terminal body portion 63. A protrusion 71 that protrudes outward of the terminal body portion 63 to the right in the direction in which terminal fittings 60 are arranged side by side is formed on the terminal body portion 63. An opening 70 that extends through the terminal body portion 63 in the direction in which terminal fittings 60 are arranged side by side is formed in a left side plate portion included in the terminal body portion 63.

In the state in which the plurality of first housings 11 and a plurality of second housings 30 are stacked and attached to each other, the terminal fittings 60 attached to the first housings 11 and the terminal fittings 60 attached to the second housings 30 are alternately arranged side by side in the stacking direction of the two types of housings 11 and 30. The protrusion 71 of one (left) terminal fitting 60 of two adjacent terminal fittings 60 enters the terminal body portion 63 from the opening 70 in the other (right) terminal fitting 60 and is connected to the connecting portion 65.

When a plurality of terminal fittings 60 are arranged so as to be side by side, the protrusion 71 of one terminal fitting 60 of adjacent terminal fittings 60 enters the terminal body portion 63 of the other terminal fitting 60 from the opening 70 thereof and is connected to the connecting portion 65. The connection between the protrusion 71 and the connecting portion 65 allows the adjacent terminal fittings 60 to be electrically connected to each other. Since no conductive member other than the terminal fittings 60 is required, the number of components can be reduced.

The connecting portion 65 includes an elastic contact piece 67 that is elastically deformable. Due to the elastic restoring force of the elastic contact piece 67, the protrusion 71 and the elastic contact piece 67 can be connected to each other with a predetermined contact pressure. The elastic contact piece 67 is housed in the terminal body portion 63, and is therefore less likely to be deformed due to interference by a foreign object. A guide surface 69 is formed on the elastic contact piece 67. In the process in which adjacent terminal fittings 60 are moved relative to each other in the front-rear direction and arranged side by side, the protrusion 71 slides against the guide surface 69. By sliding the protrusion 71 against the guide surface 69, the protrusion 71 and the elastic contact piece 67 can be smoothly connected to each other. The protrusion 71 has a bent shape formed by folding one plate-shaped portion. With this configuration, the rigidity of the protrusion 71 is higher than that in the case where the protrusion 71 has a single-plate shape.

When terminal fittings 60 are to be connected to each other, the two housings 11 and 30 are temporarily assembled in a stacked state, and the adjacent terminal fittings 60 are lined up in the stacking direction so as to be displaced in the front-rear direction. At this time, the protrusion 71 of one of the two terminal fittings 60 adjacent in the stacking direction of the two housings 11 and 30 enters the terminal body portion 63 of the other terminal fitting 60 from the opening 70 thereof. Thereafter, the terminal fittings 60 are moved relative to each other in the front-rear direction intersecting the direction in which the terminal fittings 60 are arranged side by side, the protrusion 71 slides against the guide surface 69, and the adjacent terminal fittings 60 are arranged so as to be arranged side by side. The direction in which the guide surface 69 guides the protrusion 71 is the direction (the front-rear direction) that intersects the direction in which the terminal fittings 60 are arranged side by side (the stacking direction of the two housings 11 and 30). In the first embodiment, compared to the case where the guide direction of the guide surface 69 is parallel to the direction in which the terminal fittings 60 are arranged side by side, the pitch in which the terminal fittings 60 are arranged side by side can be reduced.

The terminal body portion 63 is elongated in the front-rear direction, which is orthogonal to the direction in which the terminal fittings 60 are arranged side by side. The direction in which the protrusion 71 is moved while being guided by the guide surface 69 is the front-rear direction, which is parallel to the longitudinal direction of the terminal body portion 63. With this configuration, it is possible to ensure that the guide surface 69 is sufficiently long, so that sliding resistance in the process of the protrusion 71 sliding against the guide surface 69 can be suppressed.

The terminal housing portions 22 and 41 are configured to house terminal fittings 60 so as to be exposed in the stacking direction of the two housings 11 and 30. With this configuration, the joint connector can be downsized in the stacking direction, compared to the case where the terminal housing portions house terminal fittings without exposing them in the stacking direction.

Other Embodiments

The present invention is not limited to the embodiment described based on the above description and the drawings, but is indicated by the claims. The present invention includes meanings equivalent to the scope of the claims and all changes within the scope of the claims, and includes the following embodiments.

Each protrusion may have a single-plate shape.

The direction in which each protrusion moves when sliding against a guide surface may be parallel with the direction in which the terminal fittings are lined up.

The direction in which each protrusion moves when sliding against a guide surface may be orthogonal to the longitudinal direction of the terminal fittings.

The direction in which adjacent terminal fittings are moved so as to be arranged side by side may be parallel to the direction in which the terminal fittings are arranged side by side (the stacking direction of the stacked housing).

The direction in which adjacent terminal fittings are moved so as to be arranged side by side may be orthogonal to the direction in which the terminal fittings are line up and orthogonal to the lengthwise direction (the front-rear direction) of the terminal fittings.

A configuration may be employed where the connecting portion is not elastically deformable and the protrusion is elastically deformable, or both the connecting portion and the protrusion are elastically deformable, or the connecting portion as well as the protrusion are not elastically deformable.

LIST OF REFERENCE NUMERALS

10 Stacked Housing
11 First Housing (Housing)
12 First Plate-Shaped Base Portion
13 First Front Wall Portion

14 First Upper Wall Portion
15 First Lower Wall Portion
16 First Protruding Portion
17 First Locking Portion
18 First Widened Portion
19 First Elastic Locking Piece
20 First Locking Hole
21 First Partition Wall
22 First Terminal Housing Portion (Terminal Housing Portion)
23 First Positioning Recess
24 First Communication Hole (Communication Hole)
25 First Guide Groove
26 First Guide Wall
27 First Notch
28 First Thick Portion
29 First Guide Rib
30 Second Housing (Housing)
31 Second Plate-Shaped Base Portion
32 Second Front Wall Portion
33 Second Upper Wall Portion
34 Second Lower Wall Portion
35 Second Widened Portion
36 Second Elastic Locking Piece
37 Second Locking Hole
38 Second Protruding Portion
39 Second Locking Portion
40 Second Partition Wall
41 Second Terminal Housing Portion (Terminal Housing Portion)
42 Second Positioning Recess
43 Second Communication Hole (Communication Hole)
44 Second Guide Groove
45 Second Guide Wall
46 Second Notch
47 Second Thick Portion
48 Second Guide Rib
50 First Cover
51 First Substrate Portion
52 Upper Edge Portion
53 Second Cover
60 Terminal Fitting
61 Crimp Portion
62 Electric Wire
63 Terminal Body Portion
64 Positioning Protrusion
65 Connecting Portion
66 Pressure Receiving Portion
67 Elastic Contact Piece
68 Contact Portion
69 Guide Surface
70 Opening
71 Protrusion
72 Horizontal Plate Portion
73 Bent Portion

What is claimed is:

1. A terminal fitting connection structure for connecting a plurality of terminal fittings that are elongated in a front-rear direction to each other such that the terminal fittings are arranged side by side in one direction, wherein each terminal fitting includes a terminal body portion that has a square tubular shape elongated in the front-rear direction, and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, the opening has a slit shape elongated in the front-rear direction, a front end and a rear end of the opening are closed by the plate portion included in the terminal body portion, the protrusion of one terminal fitting of two adjacent terminal fittings enters the terminal body portion of the other terminal fitting from the opening of the other terminal fitting and is connected to the connecting portion of the other terminal fitting, the connecting portion of the other terminal fitting includes an elastic contact piece that is elastically deformable and is configured to come into contact with the protrusion of the one terminal fitting, an entirety of the elastic contact piece is disposed inside the terminal body portion of the other terminal fitting, the elastic contact piece is provided with a guide surface against which the protrusion of the one terminal fitting slides in a process in which the adjacent terminal fittings are arranged side by side, a direction in which the protrusion of the one terminal fitting moves when guided by the guide surface is parallel to a longitudinal direction of the terminal body portion of the other terminal fitting, and the adjacent terminal fittings are displaced from each other in the front-rear direction, and the protrusion of the one terminal fitting is not in contact with the elastic contact piece of the other terminal fitting in a state where the protrusion of the one terminal fitting has entered the terminal body portion of the other terminal fitting from the opening of the other terminal fitting.

2. The terminal fitting connection structure according to claim 1, wherein a direction in which the guide surface guides the protrusion of the one terminal fitting intersects the direction in which the terminal fittings are arranged side by side.

3. The terminal fitting connection structure according to claim 1, wherein the protrusion has a bent shape formed by folding a plate-shaped portion.

4. A joint connector comprising:

a plurality of housings each having a terminal housing portion, the plurality of housings being stacked and attached to each other;

a plurality of communication holes provided in the plurality of housings and communicating with internal spaces of the terminal housing portions from outer surfaces of the plurality of housings; and a plurality of terminal fittings elongated in a front-rear direction and attached to each terminal body portion, wherein each terminal fitting includes a terminal body portion that has a square tubular shape elongated in the front-rear direction, and in which a connecting portion is provided, the terminal body portion is provided with a protrusion that protrudes outward of the terminal body portion in a direction in which the terminal fittings are arranged side by side, a plate portion included in the terminal body portion is provided with an opening that extends through the plate portion in the direction in which the terminal fittings are arranged side by side, the opening has a slit shape elongated in the front-rear direction, a front end and a rear end of the opening are closed by the plate portion included in the terminal body portion, in a state where the plurality of housings are stacked and attached to each other, the protrusion of one terminal fitting of two adjacent terminal fittings enters the terminal body portion of the other terminal fitting from the opening of the other terminal fitting and is connected to the connecting portion of the other terminal fitting, the connecting portion of the other terminal fitting includes an elastic contact piece that is elastically deformable and is configured to meet the protrusion of the one terminal fitting, an entirety of the elastic contact piece is disposed inside the terminal body portion of the other terminal fitting, the elastic contact piece is provided with a guide surface against which the protrusion of the one terminal fitting slides in a process in which the adjacent terminal fittings are arranged side by side, a direction in which the protrusion of the one terminal fitting moves when guided by the guide surface is parallel to a longitudinal direction of the terminal body portion of the other terminal fitting, and the adjacent terminal fittings are displaced from each other in the front-rear direction, and the protrusion of the one terminal fitting is not in contact with the elastic contact piece of the other terminal fitting in a state where the protrusion of the one terminal fitting has entered the terminal body portion of the other terminal fitting from the opening of the other terminal fitting.

5. The joint connector according to claim 4, wherein each of the terminal housing portions is configured to house a terminal fitting such that the terminal fitting is exposed in a stacking direction in which the plurality of housings are stacked.

* * * * *